US011179698B2

(12) United States Patent
Wendland et al.

(10) Patent No.: US 11,179,698 B2
(45) Date of Patent: *Nov. 23, 2021

(54) POLYMERIC SORBENTS FOR CARBON DIOXIDE

(71) Applicant: 3M INNOVATIVE PROPERTIES COMPANY, St. Paul, MN (US)

(72) Inventors: Michael S. Wendland, North St. Paul, MN (US); Michael W. Kobe, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 789 days.

This patent is subject to a terminal disclaimer.

(21) Appl. No.: 15/777,574

(22) PCT Filed: Dec. 15, 2016

(86) PCT No.: PCT/US2016/066829
§ 371 (c)(1),
(2) Date: May 18, 2018

(87) PCT Pub. No.: WO2017/106443
PCT Pub. Date: Jun. 22, 2017

(65) Prior Publication Data
US 2021/0205780 A1 Jul. 8, 2021

Related U.S. Application Data

(60) Provisional application No. 62/269,637, filed on Dec. 18, 2015.

(51) Int. Cl.
| | | |
|---|---|---|
| *B01J 20/26* | (2006.01) |
| *C08F 212/36* | (2006.01) |
| *C08F 8/02* | (2006.01) |
| *B01D 53/02* | (2006.01) |
| *B01J 20/28* | (2006.01) |
| *B01D 53/14* | (2006.01) |
| *C08F 8/32* | (2006.01) |

(52) U.S. Cl.
CPC .......... *B01J 20/264* (2013.01); *B01D 53/02* (2013.01); *B01D 53/14* (2013.01); *B01J 20/265* (2013.01); *B01J 20/28057* (2013.01); *B01J 20/28069* (2013.01); *C08F 8/32* (2013.01); *C08F 212/36* (2013.01); *B01D 2253/202* (2013.01); *B01D 2253/306* (2013.01); *B01D 2253/311* (2013.01); *B01D 2256/245* (2013.01); *B01D 2257/504* (2013.01)

(58) Field of Classification Search
CPC .. B01J 20/264; B01J 20/265; B01J 20/28069; C08F 8/32; B01D 53/02; B01D 53/14
USPC ........................................................ 423/220
See application file for complete search history.

(56) References Cited

U.S. PATENT DOCUMENTS

| | | | |
|---|---|---|---|
| 3,799,870 | A | 3/1974 | Heilweil |
| 4,273,751 | A | 6/1981 | Sinha |
| 4,443,354 | A | 4/1984 | Eian |
| 4,677,096 | A | 6/1987 | van der Smissen |
| 6,930,219 | B2 | 8/2005 | Shan |
| 7,559,981 | B2 | 7/2009 | Friday |
| 8,470,074 | B2 | 6/2013 | Baugh |
| 9,776,131 | B2 | 10/2017 | Eisenberger |
| 10,780,416 | B2 * | 9/2020 | Wendland ................. C08F 8/32 |
| 10,967,359 | B2 * | 4/2021 | Wendland .......... B01J 20/28057 |
| 11,014,070 | B2 * | 5/2021 | Kobe .................. B01J 20/3042 |
| 2008/0319097 | A1 | 12/2008 | Johannsen |
| 2009/0060809 | A1 | 3/2009 | Shioya |
| 2014/0186250 | A1 | 7/2014 | Levan |
| 2017/0333870 | A1 | 11/2017 | Wendland |

FOREIGN PATENT DOCUMENTS

| | | |
|---|---|---|
| CN | 104923186 A | 9/2015 |
| WO | WO 2011/035195 | 3/2011 |
| WO | WO 2015/095110 | 6/2015 |
| WO | WO 2015/095115 | 6/2015 |
| WO | WO 2016/186858 | 11/2016 |
| WO | WO 2016/205083 | 12/2016 |
| WO | WO 2016/205444 | 12/2016 |
| WO | WO 2017/106434 | 6/2017 |
| WO | WO 2017/106438 | 6/2017 |
| WO | WO 2017/160650 | 9/2017 |

OTHER PUBLICATIONS

Croll et al., Langmuir, 19(14), (2003), p. 5918-5922. (Disclosed in Applicants' IDS).*
Arean, "Carbon dioxide and nitrogen adsorption on porous copolymers of divinylbenzene and acrylic acid", Adsorption, Apr. 2013, vol. 19, No. 2-4, pp. 367-372.
Bicak, "Aldehyde Separation by Polymer-Supported Oligo (ethyleneimines)", Journal of Polymer Science: Part A: Polymer Chemistry, Jul. 1997, vol. 35, No. 14, pp. 2857-2864, XP55027595.
Bottcher, "Silica Sol-Gel Glasses with Embedded Organic Liquids", Advanced Materials, Feb. 1999, vol. 11, No. 2, pp. 138-141.
Carta, "Novel Spirobisindanes for Use as Precursors to Polymers of Intrinsic Microporosity", Organic Letters, 2008, vol. 10, No. 13, pp. 2641-2643.
Cecile, "Hydrophilic Polystyrene/Maleic Anhydride Ultrafine Fibrous Membranes", Journal of Applied Polymer Science, Jan. 2010, vol. 115, No. 2, pp. 723-730.

(Continued)

*Primary Examiner* — Yong L Chu
(74) *Attorney, Agent, or Firm* — Jean A. Lown

(57) ABSTRACT

Polymeric sorbents for carbon dioxide are provided. More particularly, the polymeric sorbents are a reaction product of a divinylbenzene/maleic anhydride precursor polymeric material with a nitrogen-containing compound. The nitrogen-containing compound is covalently attached to the polymeric sorbents. Additionally, methods of sorbing carbon dioxide on the polymeric sorbents and compositions resulting from sorbing carbon dioxide on the polymeric sorbents are provided. The polymeric sorbents typically are porous and can selectively remove carbon dioxide from other gases such as methane or hydrogen.

14 Claims, 3 Drawing Sheets

(56) References Cited

OTHER PUBLICATIONS

Chen, "Stability and Equilibrium Properties of Macroreticular Resins for Flue Gas Desulfurization", Industrial and Engineering Chemistry Research, 1990, vol. 29, No. 3, pp. 440-447, XP055356157.
Chowdhury, "Synthesis and characterization of radiation grafted films for removal of arsenic and some heavy metals from contaminated water", Radiation Physics and Chemistry, Oct. 2012, vol. 81, No. 10, pp. 1606-1611.
Croll, "Formation of Tectocapsules by Assembly and Cross-linking of Poly(divinylbenzene-alt-maleic anhydride) Spheres at the Oil-Water Interface", Langmuir, May 2003, vol. 19, No. 14, pp. 5918-5922, XP055355244.
Gorka, "KOH activation of mesoporous carbons obtained by soft-templating", Carbon, Jul. 2008, vol. 46, No. 8, pp. 1159-1161.
Harada, "Removal of primary and secondary amines by reaction gas chromatography using porous maleic anhydride—divinylbenzene copolymer beads", Pharmaceutical Science Department, Kumamoto University, Jul. 1982, vol. 31, pp. 697-701.
Kaliva, "Microporous Polystyrene Particles for Selective Carbon Dioxide Capture", Langmuir, Feb. 2012, vol. 28, No. 5, pp. 2690-2695.
Niu, "Highly dispersed Ru on K-doped meso-macroporous $SiO_2$ for the preferential oxidation of CO in $H_2$-rich gases", International Journal of Hydrogen Energy, 2014, vol. 39, No. 25, pp. 13800-13807.
Ogawa, "Preparation of Spherical Polymer Beads of Maleic Anhydride-Styrene-Divinylbenzene and Metal Sorption of its Derivatives", Journal of Applied Polymer Science, 1984, vol. 29, No. 9, pp. 2851-2856.
Okay, "Porous Maleic Anhydride-Styrene-Divinylbenzene Copolymer Beads", Journal of Applied Polymer Science, Jul. 1987, vol. 34, pp. 307-317, XP055356037.
Song, "Coordination of Metal Cations with Amino-Functionalized MCM-41 for Adsorptive Desulfurization", Advanced Materials Research, 2014, vols. 926-930, pp. 4222-4225.
Woodward, "Swellable, Water- and Acid-Tolerant Polymer Sponges for Chemoselective Carbon Dioxide Capture", Journal of the American Chemical Society, 2014, vol. 136, No. 25, pp. 9028-9035.
Yan, "In situ growth of a carbon interphase between carbon fibres and a polycarbosilane-derived silicon carbide matrix", Carbon, 2011, vol. 49, No. 8, pp. 2869-2877.
Yang, "A Pervaporation Study of Ammonia Solutions Using Molecular Sieve Silica Membranes", Membranes, 2014, vol. 4, No. 1, pp. 40-54.
Yim, "Removal of Formaldehyde Over Amine Functionalized SBA-15", Journal of Nanoscience and Nanotechnology, 2011, vol. 11, No. 2, pp. 1714-1717.
International Search Report for PCT International Application No. PCT/US2016/066829, dated Apr. 3, 2017, 5 pages.

* cited by examiner

POLYMERIC SORBENTS FOR CARBON DIOXIDE

CROSS REFERENCE TO RELATED APPLICATIONS

This application is a national stage filing under 35 U.S.C. 371 of PCT/US2016/066829, filed Dec. 15, 2016, which claims the benefit of U.S. Provisional Application No. 62/269,637, filed Dec. 18, 2015, the disclosure of which is incorporated by reference in its/their entirety herein.

TECHNICAL FIELD

Polymeric sorbents for carbon dioxide, methods of sorbing carbon dioxide on the polymeric sorbents, and compositions resulting from the sorption of carbon dioxide on the polymeric sorbents are provided.

BACKGROUND

The production of energy from coal and natural gas requires technologies to remove carbon dioxide ($CO_2$), which is a gaseous impurity in both processes. The low cost and global abundance of both coal and natural gas all but ensures the continued use of these two natural resources for energy generation for many years to come. Efforts to develop technologies to improve the removal of unwanted $CO_2$ through the development of selective, high capacity sorbents for $CO_2$ are needed.

To generate energy from coal, integrated gasification combined cycle (IGCC) power plants make use of the water-gas shift reaction. Coal is burned and the carbon monoxide that is produced is then reacted with water in a reactor containing a catalyst to perform the water-gas shift reaction. This reaction converts water and carbon monoxide to carbon dioxide and hydrogen. The $CO_2/H_2$ gas stream produced (called synthetic gas or syngas) typically contains about 35-40 mole percent $CO_2$. An important step in electricity generation at IGCC power plants is the removal of the carbon dioxide generated by the water-gas shift reaction to produce fuel grade or even higher purity hydrogen. The hydrogen is subsequently used to power a combined cycle turbine that produces electricity.

The most widely used method to remove the $CO_2$ from $H_2$ is a pressure swing adsorption cycle with the sorbent being a physical solvent. In a pressure swing adsorption cycle, a $CO_2/H_2$ gas stream at high pressure (e.g., 20-45 bar) is passed through the physical solvent resulting in a purified $H_2$ stream exiting the sorbent vessel. The adsorption portion of the cycle is stopped prior to breakthrough of a targeted level of $CO_2$. A desorption step is then performed to regenerate the physical solvent.

Physical solvents separate $CO_2$ from other gases based on a difference in solubility. Because there are only weak interactions between the $CO_2$ and the physical solvent, the $CO_2$ can be easily removed from the physical solvent by reducing the pressure. While there are several different physical solvents in use today, polyethylene glycol dimethyl ether (available under the trade designation SELEXOL) is the most commonly used. While the adsorption selectivity for $CO_2$ is high, the solubility of $CO_2$ in SELEXOL at 20 bar and 25° C. is only about 9.6 weight percent. Although the solubility amount can vary depending on the temperature and pressure used in the process, the ability to capture a higher percentage of $CO_2$ per mass of sorbent while maintaining selectivity over other gases such as hydrogen would be highly advantageous.

Natural gas production requires an extensive set of processes to purify the natural gas sufficiently to prepare a useable fuel. Typical impurities include acid gases (such as hydrogen sulfide and sulfur dioxide), water, and carbon dioxide. Carbon dioxide is typically present in the natural gas at a level close to 5 volume percent. While the most common method to remove $CO_2$ from methane is a pressure swing adsorption cycle, the low partial pressure of the $CO_2$ in the mixture makes the removal of $CO_2$ with physical solvents impractical. A stronger interaction between the $CO_2$ and solvent is required. As such, chemical solvents are typically used. The most widely used chemical solvent is an aqueous solution of ethanol amine. In a single pressure swing adsorption cycle, ethanol amine can separate/capture about 5 percent of its mass in $CO_2$. While the strong interaction of the $CO_2$ with the chemical solvent allows for the efficient removal of the $CO_2$ from the gas stream, regeneration of the chemical solvent requires heating. This heating step tends to render the overall process energetically expensive.

Polymeric materials prepared from divinylbenzene and maleic anhydride have been known for many years. Many of these polymeric materials are prepared by a process called macroreticulation, which refers to a process of making polymeric beads using suspension polymerization. These processes involve forming droplets of an organic phase suspended in an aqueous phase. The suspended organic phase includes the monomers and an optional porogen. The maleic anhydride content in the final copolymer has been low, however, because this monomer tends to undergo hydrolysis and leave the organic phase. Attempts to reduce the hydrolysis reaction have included replacing the aqueous phase with glycerol or other polar solvents. Macroporous copolymers have been prepared.

SUMMARY

Polymeric sorbents for carbon dioxide are provided. More particularly, the polymeric sorbents are a reaction product of a divinylbenzene/maleic anhydride precursor polymeric material with a nitrogen-containing compound. The nitrogen-containing compound is covalently attached to the resulting polymeric sorbent. Additionally, methods of sorbing carbon dioxide on the polymeric sorbents and compositions resulting from the sorption of carbon dioxide on the polymeric sorbents are provided. The polymeric sorbents typically are porous and can selectively remove carbon dioxide from other gases such as methane or hydrogen. The pores of the polymeric sorbent are often in the size range of mesopores and/or micropores.

In a first aspect, a polymeric sorbent is provided. The polymeric sorbent is a reaction product of (a) a precursor polymeric material and (b) a nitrogen-containing compound. The precursor polymeric material comprises a polymerized product of a polymerizable composition containing (1) 8 to 40 weight percent maleic anhydride based on the total weight of monomers in the polymerizable composition, (2) 48 to 75 weight percent divinylbenzene based on the total weight of monomers in the polymerizable composition, and (3) 0 to 20 weight percent of a styrene-type monomer based on the total weight of monomers in the polymerizable composition, wherein the styrene-type monomer is styrene, an alkyl-substituted styrene, or a combination thereof. The nitrogen-containing compound is selected from ammonia, a compound having a single primary amino group (—NH$_2$), or a compound having at least two amino groups of formula —NHR where R is hydrogen or alkyl.

In a second aspect, a method of sorbing carbon dioxide on a polymeric sorbent is provided. The method includes providing a polymeric sorbent as described above and then sorbing carbon dioxide on the polymeric sorbent.

In a third aspect, a composition is provided that includes (a) a polymeric sorbent as described above and (b) carbon dioxide sorbed on the polymeric sorbent.

In a fourth aspect, a method of preparing a polymeric sorbent is provided. The method includes providing a precursor polymeric material. The precursor polymeric material comprises a polymerized product of a polymerizable composition containing (1) 8 to 40 weight percent maleic anhydride based on the total weight of monomers in the polymerizable composition, (2) 48 to 75 weight percent divinylbenzene based on the total weight of monomers in the polymerizable composition, and (3) 0 to 20 weight percent of a styrene-type monomer based on the total weight of monomers in the polymerizable composition, wherein the styrene-type monomer is styrene, an alkyl-substituted styrene, or a combination thereof. The method further includes reacting the precursor polymeric material with a nitrogen-containing compound that is selected from ammonia, a compound having a single primary amino group (—NH$_2$), or a compound having at least two amino groups of formula —NHR where R is hydrogen or alkyl. The reacting results in the formation of the polymeric sorbent having a covalently attached nitrogen-containing group.

DETAILED DESCRIPTION

Figure 1:
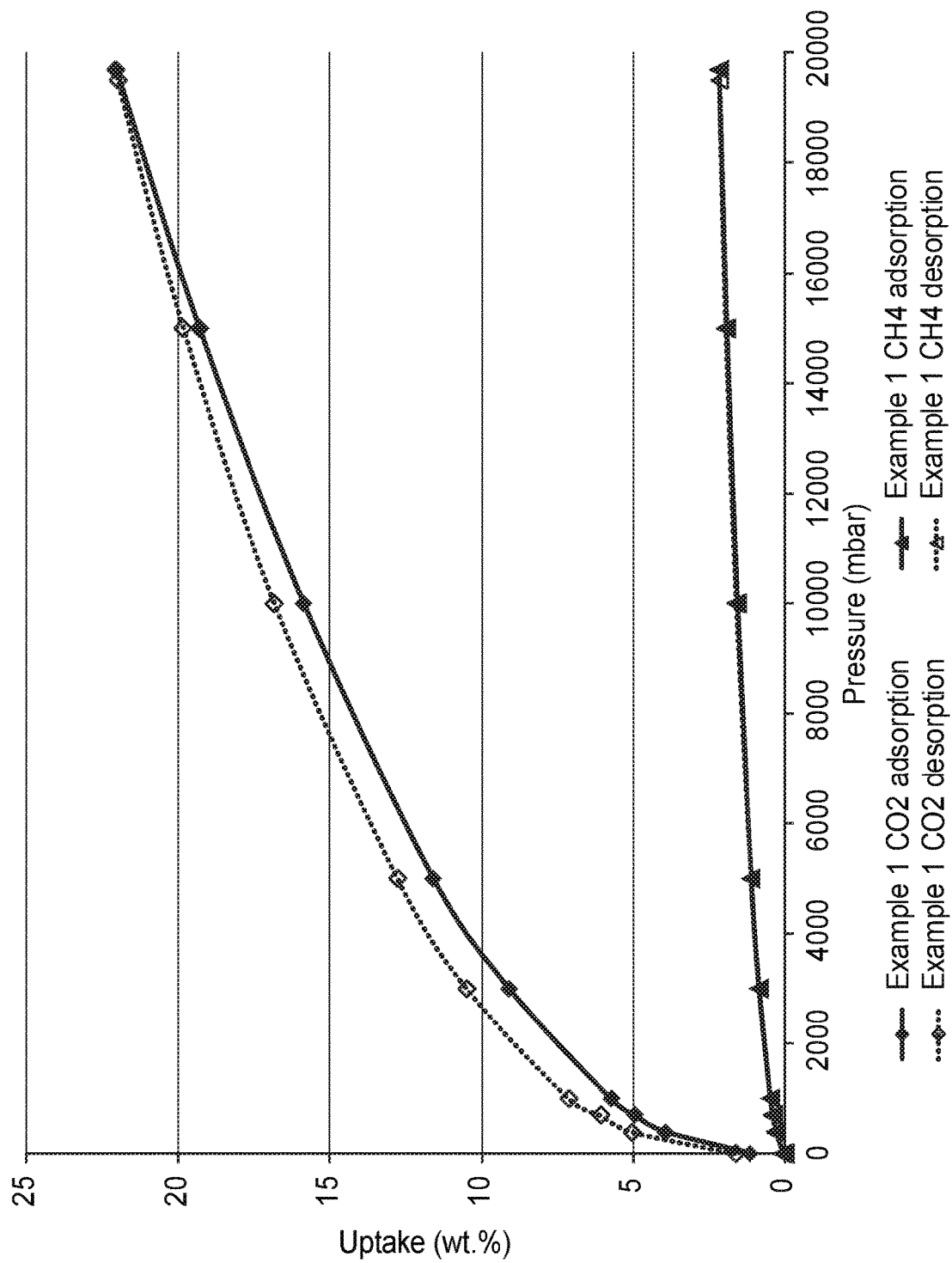
FIG. 1 is a plot of the adsorption and desorption isotherms at 25° C. and at pressures up to about 20 bar for both carbon dioxide and methane on the exemplary porous polymeric sorbent of Example 1.

Polymeric sorbents for carbon dioxide are provided. More particularly, the polymeric sorbents are a reaction product of a divinylbenzene/maleic anhydride precursor polymeric material with a nitrogen-containing compound. The nitrogen-containing compound is covalently attached to the polymeric sorbents. Additionally, methods of making the polymeric sorbents, methods of sorbing carbon dioxide on the polymeric sorbents and compositions resulting from sorption of carbon dioxide on the polymeric sorbents are provided. The polymeric sorbents typically are porous and can selectively remove carbon dioxide from other gases such as methane or hydrogen. The pores of the polymeric sorbent are often in the size range of mesopores and/or micropores.

The terms "a", "an", and "the" are used interchangeably with "at least one" to mean one or more of the elements being described.

The term "and/or" means either or both. For example "A and/or B" means only A, only B, or both A and B.

The terms "polymer" and "polymeric material" are used interchangeably and refer to materials formed by reacting one or more monomers. The terms include homopolymers, copolymers, terpolymers, or the like. Likewise, the terms "polymerize" and "polymerizing" refer to the process of making a polymeric material that can be a homopolymer, copolymer, terpolymer, or the like.

The terms "polymeric sorbent" and "porous polymeric sorbent" are used interchangeably to refer to a polymeric material that is porous and that can sorb gaseous substances such as, for example, carbon dioxide. Porous materials such as the polymeric sorbents can be characterized based on the size of their pores. The term "micropores" refers to pores having a diameter less than 2 nanometers. The term "mesopores" refers to pores having a diameter in a range of 2 to 50 nanometers. The term "macropores" refers to pores having a diameter greater than 50 nanometers. The porosity of a polymeric sorbent can be characterized from an adsorption isotherm of an inert gas such as nitrogen or argon by the porous material under cryogenic conditions (e.g., liquid nitrogen at 77° K). The adsorption isotherm is typically obtained by measuring adsorption of the inert gas such as argon by the porous polymeric sorbent at multiple relative pressures in a range of about $10^{-6}$ to about 0.98±0.01. The isotherms are then analyzed using various methods such as the BET (Brunauer-Emmett-Teller) method to calculate specific surface area and such as Density Functional Theory (DFT) to characterize the porosity and the pore size distribution.

The term "sorbing" and similar words such as "sorb", "sorbed", and "sorption" refer to the addition of a first substance (e.g., a gas such as carbon dioxide, hydrogen, or methane) to a second substance (e.g., a polymeric material such as the porous polymeric sorbent) by adsorbing, absorbing, or both. Likewise, the term "sorbent" refers to a second substance that sorbs a first substance by adsorbing, absorbing, or both.

The term "surface area" refers to the total area of a surface of a material including the internal surfaces of accessible pores. The surface area is typically calculated from adsorption isotherms obtained by measuring the amount of an inert gas such as nitrogen or argon that adsorbs on the surface of a material under cryogenic conditions (e.g., liquid nitrogen 77° K) over a range of relative pressures. The term "BET specific surface area" is the surface area per gram of a material (typically, m$^2$/gram) that is typically calculated from adsorption isotherm data of the inert gas over a relative pressure range of 0.05 to 0.30 using the BET method.

The term "polymerizable composition" includes all materials included in the reaction mixture used to form the polymeric material. The polymerizable composition includes, for example, the monomer mixture, the organic solvent, the initiator, and other optional components. Some of the components in the polymerizable composition such as the organic solvent may not undergo a chemical reaction but can influence the chemical reaction and the resulting polymeric material.

The term "monomer mixture" refers to that portion of a polymerizable composition that includes the monomers. More specifically, as used herein, the monomer mixture includes at least divinylbenzene and maleic anhydride.

The terms "divinylbenzene/maleic anhydride polymeric material" and "divinylbenzene/maleic anhydride precursor polymeric material" are used interchangeably and refer to a polymeric material prepared from divinylbenzene, maleic anhydride, and optionally a styrene-type monomer.

The term "styrene-type monomer" refers to styrene, an alkyl-substituted styrene (e.g., ethyl styrene), or mixtures thereof. These monomers are often present in divinylbenzene as impurities.

The term "room temperature" refers to a temperature in a range of 20° C. to 30° C., in a range of 20° C. to 25° C., a range close to 25° C., or 25° C.

In a one aspect, a polymeric sorbent is provided. In another aspect, a method of preparing the polymeric sorbent is provided. The porous polymeric sorbent is formed by reacting a precursor polymeric material with a nitrogen-containing compound. The precursor polymeric material is formed from divinylbenzene, maleic anhydride, and an optional styrene-type monomer. The precursor polymeric material can be referred to as a divinylbenzene/maleic anhydride polymeric material. The conditions used to synthesize the precursor polymeric material are specifically selected to produce a polymeric sorbent that has a high BET specific surface area (e.g., equal to at least 250 m²/gram). The nitrogen-containing compound reacts with an anhydride group in the precursor polymeric material. This reaction results in the formation of a covalent bond linking the nitrogen-containing compound to the polymeric material. That is, the nitrogen-containing compound becomes part of the polymeric sorbent.

The precursor polymeric material (i.e., the divinylbenzene/maleic anhydride polymeric material) is synthesized from a polymerizable composition that includes a monomer mixture containing maleic anhydride, divinylbenzene, and an optional styrene-type monomer. More specifically, the precursor polymeric material is formed from a monomer mixture containing 1) 8 to 40 weight percent maleic anhydride, 2) 48 to 75 weight percent divinylbenzene, and 3) 0 to 20 weight percent of a styrene-type monomer, wherein the styrene-type monomer is styrene, an alkyl-substituted styrene, or a combination thereof. The amounts are based on the total weight of monomers in the monomer mixture, which is equal to the total weight of monomers in the polymerizable composition.

The maleic anhydride that is included in the monomer mixture results in the formation of maleic anhydride monomeric units of Formula (I) within the precursor polymeric material.

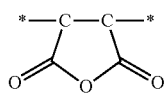

(I)

The asterisks in this formula and other formulas contained herein denote the location of attachment of the monomeric unit to another monomeric unit or to a terminal group.

The amount of maleic anhydride used to form the precursor polymeric material influences the amount of nitrogen-containing compound that can react with the precursor polymeric material to form the polymeric sorbent. The nitrogen-containing compound reacts with the anhydride group to become covalently attached to the polymeric material that is the polymeric sorbent.

In some embodiments, the amount of maleic anhydride included in the monomer mixture is at least 8 weight percent, at least 10 weight percent, at least 12 weight percent, at least 15 weight percent, or at least 20 weight percent. The amount of maleic anhydride can be up to 40 weight percent, up to 38 weight percent, up to 35 weight percent, up to 30 weight percent, or up to 25 weight percent. For example, the maleic anhydride may be present in a range of 8 to 40 weight percent, 8 to 38 weight percent, 10 to 40 weight percent, 10 to 35 weight percent, 10 to 30 weight percent, 10 to 25 weight percent, 15 to 40 weight percent, 15 to 35 weight percent, 15 to 30 weight percent, 15 to 25 weight percent, 20 to 40 weight percent, 20 to 35 weight percent, or 20 to 30 weight percent. The amounts are based on the total weight of monomers in the monomer mixture contained in the polymerizable composition used to form the precursor polymeric material.

Stated differently, the precursor polymeric material often contains monomeric units of Formula (I) in a range of 8 to 40 weight percent, 8 to 38 weight percent, 10 to 40 weight percent, 10 to 35 weight percent, 10 to 30 weight percent, 10 to 25 weight percent, 15 to 40 weight percent, 15 to 35 weight percent, 15 to 30 weight percent, 15 to 25 weight percent, 20 to 40 weight percent, 20 to 35 weight percent, or 20 to 30 weight percent. These amounts are based on the total weight of monomeric units in the precursor polymeric material.

The divinylbenzene included in the monomer mixture results in the formation of divinylbenzene monomeric units of Formula (II) within the precursor polymeric material.

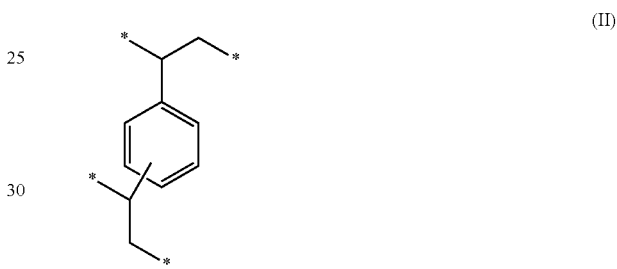

(II)

The two groups attached to the benzene ring can be in an ortho, meta, or para arrangement to each other. The monomeric units of Formula (II) contribute to the high crosslink density and to the formation of a rigid polymeric material having micropores and/or mesopores.

The amount of divinylbenzene used to form the precursor polymeric material can have a strong influence on the BET specific surface area of both the precursor polymeric material and the polymeric sorbent. The BET specific surface area tends to increase with an increase in the amount of divinylbenzene in the monomer mixture used to form the precursor polymeric material and with the resulting amount of monomeric units of Formula (II) in the polymeric sorbent. If the amount of divinylbenzene is less than 48 weight percent, the polymeric sorbent may not have a sufficiently high BET specific surface area. On the other hand, if the amount of divinylbenzene is greater than 75 weight percent, the amount of carbon dioxide sorbed may be compromised because there are fewer nitrogen-containing groups in the polymeric sorbent and because the solubility of carbon dioxide in the polymeric sorbent may decrease. In some embodiments, the amount of divinylbenzene included in the monomer mixture is at least 48 weight percent, at least 50 weight percent, at least 55 weight percent, or at least 60 weight percent. The amount of divinylbenzene can be up to 75 weight percent, up to 70 weight percent, or up to 65 weight percent. For example, the amount can be in a range of 48 to 75 weight percent, 50 to 75 weight percent, 50 to 70 weight percent, 50 to 65 weight percent, 55 to 75 weight percent, 55 to 70 weight percent, 55 to 65 weight percent, 60 to 75 weight percent, or 60 to 70 weight percent. The amounts are based on the total weight of monomers in the monomer mixture used to form the precursor polymeric material. In some specific embodiments, the amount of divinylbenzene is in a range of 50 to 65 weight percent based on the total weight of the monomer mixture.

Stated differently, the precursor polymeric material contains monomeric units of Formula (II) in a range of 48 to 75 weight percent, 50 to 75 weight percent, 50 to 70 weight percent, 50 to 65 weight percent, 55 to 75 weight percent, 55 to 70 weight percent, 55 to 65 weight percent, 60 to 75 weight percent, or 60 to 70 weight percent. These amounts are based on the total weight of the monomeric units in the precursor polymeric material. In some specific embodiments, the amount of the monomeric unit of Formula (II) is in a range of 50 to 65 weight percent based on the total weight of monomeric units in the precursor polymeric material.

Divinylbenzene can be difficult to obtain in a pure form. For example, divinylbenzene is often commercially available with purity as low as 55 weight percent. Obtaining divinylbenzene with purity greater than about 80 weight percent can be difficult and/or expensive. The impurities accompanying divinylbenzene are typically styrene-type monomers such as styrene, alkyl-substituted styrene (e.g., ethyl styrene), or mixtures thereof. Thus, styrene-type monomers are often present along with divinylbenzene and maleic anhydride in the monomer mixture used to form the precursor polymeric material. The monomer mixture typically contains 0 to 20 weight percent styrene-type monomers based on the total weight of monomers in the monomer mixture. If the content of the styrene-type monomer is greater than 20 weight percent, the crosslink density may be too low and/or the distance between crosslinks may be too large to provide a polymeric sorbent with the desired high BET specific surface area (e.g., at least 250 m$^2$/grams). As the crosslink density decreases, the polymeric sorbent tends to be less rigid and less porous.

Typically, divinylbenzene having a purity of 55 weight percent is not suitable for use in the monomer mixtures used to form the precursor polymeric material because the content of styrene-type monomer impurities is too high. That is, to provide a monomer mixture having a minimum amount of 48 weight percent divinylbenzene, the divinylbenzene often is at least about 80 weight percent pure. Using divinylbenzene having a lower purity than about 80 weight percent can result in the formation of a precursor polymeric material and/or a polymeric sorbent with an undesirably low BET specific surface area.

The styrene-type monomers included in the monomer mixture result in the presence of styrene-type monomeric units of Formula (III) within the precursor polymeric material.

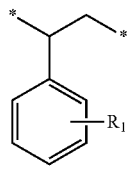

(III)

Group $R_1$ is hydrogen or alkyl (e.g., an alkyl having 1 to 10 carbon atoms, 1 to 6 carbon atoms or 1 to 4 carbon atoms).

In some embodiments, the amount of styrene-type monomers used to form the precursor polymeric material is at least 1 weight percent, at least 2 weight percent, or at least 5 weight percent. The amount of styrene-type monomers can be up to 20 weight percent, up to 15 weight percent, up to 12 weight percent, or up to 10 weight percent. For example, the amount can be in a range of 0 to 20 weight percent, 1 to 20 weight percent, 2 to 20 weight percent, 5 to 20 weight percent, 5 to 15 weight percent, or 10 to 15 weight percent. The amounts are based on the total weight of monomers in the monomer mixture used to form the precursor polymeric material.

Stated differently, the precursor polymeric material contains monomeric units of Formula (III) in a range of 0 to 20 weight percent, 1 to 20 weight percent, 2 to 20 weight percent, 5 to 20 weight percent, 5 to 15 weight percent, or 10 to 15 weight percent. The amounts are based on the total weight of monomeric units contained in the precursor polymeric material.

Overall, the precursor polymeric material is formed from a monomer mixture that includes 8 to 40 weight percent maleic anhydride, 48 to 75 weight percent divinylbenzene, and 0 to 20 weight percent styrene-type monomer. In other embodiments, the monomer mixture contains 10 to 40 weight percent maleic anhydride, 50 to 75 weight percent divinylbenzene, and 1 to 20 weight percent styrene-type monomer. In other embodiments, the monomer mixture contains 15 to 35 weight percent maleic anhydride, 55 to 75 weight percent divinylbenzene, and 1 to 20 weight percent styrene-type monomer. In still other embodiments, the monomer mixture contains 20 to 30 weight percent maleic anhydride, 55 to 75 weight percent divinylbenzene, and 1 to 20 weight percent styrene-type monomer. In further embodiments, the monomer mixture contains 20 to 35 weight percent maleic anhydride, 55 to 70 weight percent divinylbenzene, and 1 to 20 weight percent styrene-type monomers. In still further embodiments, the monomer mixture contains 20 to 40 weight percent maleic anhydride, 50 to 70 weight percent divinylbenzene, and 5 to 20 weight percent styrene-type monomer. The weight percent values are based on the total weight of monomers in the monomer mixture used to form the precursor polymeric material.

The monomer mixture included in the polymerizable composition used to form the precursor polymeric material typically contains at least 95 weight percent monomers selected from maleic anhydride, divinylbenzene, and styrene-type monomer. For example, at least 97 weight percent, at least 98 weight percent, at least 99 weight percent, at least 99.5 weight percent, at least 99.9 weight percent, or 100 weight percent of the monomers in the monomer mixture are selected from maleic anhydride, divinylbenzene, and styrene-type monomer. In some embodiments, where high purity divinylbenzene is used, the monomer mixture contains only divinylbenzene and maleic anhydride. That is, the sum of the amount of divinylbenzene and maleic anhydride is 100 weight percent.

In addition to the monomer mixture, the polymerizable composition used to form the precursor polymeric material includes an organic solvent. The polymerizable composition is a single phase prior to polymerization. That is, prior to polymerization, the polymerizable composition is not a suspension. The organic solvent is selected to dissolve the monomers included in the monomer mixture and to solubilize the precursor polymeric material as it begins to form. The organic solvent typically includes a ketone, ester, acetonitrile, or mixture thereof.

The organic solvent can function as a porogen during the formation of the precursor polymeric material. The organic solvent choice can strongly influence the BET specific surface area and the size of the pores formed in the precursor polymeric material. Using organic solvents that are miscible with both the monomers and the forming polymer tend to result in the formation of micropores and mesopores within the precursor polymeric material. Good solvents for the monomers and the forming polymer tend to result in a larger fraction of the porosity of the final polymeric sorbent being in the form of micropores and mesopores.

Organic solvents that are particularly suitable include ketones, esters, acetonitrile, and mixtures thereof. Provided that the resulting precursor polymeric material has a BET specific surface area equal to at least 350 m²/gram or even equal to at least 400 m²/gram, other organic solvents can be added along with one or more of these organic solvents. Examples of suitable ketones include, but are not limited to, alkyl ketones such as methyl ethyl ketone and methyl isobutyl ketone. Examples of suitable esters include, but are not limited to, acetate esters such as ethyl acetate, propyl acetate, butyl acetate, amyl acetate, and tert-butyl acetate.

The organic solvent can be used in any desired amount. The polymerizable compositions often have percent solids in a range of 1 to 75 weight percent (i.e., the polymerizable composition contains 25 to 99 weight percent organic solvent). If the percent solids is too low, the polymerization time may become undesirably long. The percent solids is often at least 1 weight percent, at least 2 weight percent, at least 5 weight percent, at least 10 weight percent, or at least 15 weight percent. If the weight percent solids is too great, however, the monomers do not form a single phase with the organic solvent. Further, increasing the percent solids tends to result in the formation of precursor polymeric material with a lower BET specific surface area. The percent solids can be up to 75 weight percent, up to 70 weight percent, up to 60 weight percent, up to 50 weight percent, up to 40 weight percent, up to 30 weight percent, or up to 25 weight percent. For example, the percent solids can be in a range of 5 to 75 weight percent, 5 to 50 weight percent, 5 to 40 weight percent, 5 to 30 weight percent, or 5 to 25 weight percent.

In addition to the monomer mixture and organic solvent, the polymerizable compositions used to form the precursor polymeric material typically include an initiator for free radical polymerization reactions. Any suitable free radical initiator can be used. Suitable free radical initiators are typically selected to be miscible with the monomers included in the polymerizable composition. In some embodiments, the free radical initiator is a thermal initiator that can be activated at a temperature above room temperature. In other embodiments, the free radical initiator is a redox initiator. Because the polymerization reaction is a free radical reaction, it is desirable to minimize the amount of oxygen in the polymerizable composition.

Both the type and amount of initiator can affect the polymerization rate. In general, increasing the amount of the initiator tends to lower the BET specific surface area; however, if the amount of initiator is too low, it may be difficult to obtain high conversions of the monomers to polymeric material. The free radical initiator is typically present in an amount in a range of 0.05 to 10 weight percent, 0.05 to 8 weight percent, 0.05 to 5 weight percent, 0.1 to 10 weight percent, 0.1 to 8 weight percent, 0.1 to 5 weight percent, 0.5 to 10 weight percent, 0.5 to 8 weight percent, 0.5 to 5 weight percent, 1 to 10 weight percent, 1 to 8 weight percent, or 1 to 5 weight percent. The weight percent is based on the total weight of monomers in the polymerizable composition.

Suitable thermal initiators include organic peroxides and azo compounds. Example azo compounds include, but are not limited to, those commercially available under the trade designation VAZO from E.I. du Pont de Nemours Co. (Wilmington, Del.) such as VAZO 64 (2,2'-azobis(isobutyronitrile)), which is often referred to as AIBN, and VAZO 52 (2,2'-azobis(2,4-dimethylpentanenitrile)). Other azo compounds are commercially available from Wako Chemicals USA, Inc. (Richmond, Va.) such as V-601 (dimethyl 2,2'-azobis(2-methylproprionate)), V-65 (2,2'-azobis(2,4-dimethyl valeronitrile)), and V-59 (2,2'-azobis(2-methylbutyronitrile)). Organic peroxides include, but are not limited to, bis(1-oxoaryl)peroxides such as benzoyl peroxide (BPO), bis(1-oxoalkyl)peroxides such as lauroyl peroxide, and dialkyl peroxides such as dicumyl peroxide or di-tert-butyl peroxide and mixtures thereof. The temperature needed to activate the thermal initiator is often in a range of 25° C. to 160° C., in a range of 30° C. to 150° C., in a range of 40° C. to 150° C., in a range of 50° C. to 150° C., in a range of 50° C. to 120° C., or in a range of 50° C. to 110° C.

Suitable redox initiators include arylsulfinate salts, triarylsulfonium salts, or N,N-dialkylaniline (e.g., N,N-dimethylaniline) in combination with a metal in an oxidized state, a peroxide, or a persulfate. Specific arylsulfinate salts include tetraalkylammonium arylsulfinates such as tetrabutylammonium 4-ethoxycarbonylbenzenesulfinate, tetrabutylammonium 4-trifluoromethylbenzenesulfinate, and The polymerizable composition is typically free or substantially free of surfactants. As used herein, the term "substantially free" in reference to the surfactant means that no surfactant is purposefully added to the polymerizable composition and any surfactant that may be present is the result of being an impurity in one of the components of the polymerizable composition (e.g., an impurity in the organic solvent or in one of the monomers). The polymerizable composition typically contains less than 0.5 weight percent, less than 0.3 weight percent, less than 0.2 weight percent, less than 0.1 weight percent, less than 0.05 weight percent, or less than 0.01 weight percent surfactant based on the total weight of the polymerizable composition. The absence of a surfactant is advantageous because these materials tend to restrict access to and, in some cases, fill micropores and mesopores in a precursor polymeric material.

When the polymerizable composition is heated in the presence of a free radical initiator, polymerization of the monomers in the monomer mixture occurs. By balancing the amounts of each monomer in the monomer mixture and by selection of an organic solvent that can solubilize all of the monomers and the growing polymeric material during its early formation stage, a precursor polymeric material can be prepared that has a BET specific surface area equal to at least 350 m²/gram. The BET specific surface area of the precursor polymeric material can be at least 400 m²/gram, at least 450 m²/gram, or at least 500 m²/gram. The BET specific surface area can be, for example, up to 1000 m²/gram or higher, up to 900 m²/gram, up to 800 m²/gram, up to 750 m²/gram, or up to 700 m²/gram.

The precursor polymeric material is the reaction product of the polymerizable composition. The precursor polymeric material contains (a) 8 to 40 weight percent of a first monomeric unit of Formula (I),

(b) 48 to 75 weight percent of a second monomeric unit of Formula (II), and

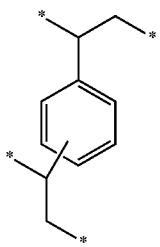

(II)

(c) 0 to 20 weight percent of a third monomeric unit of Formula (III), wherein $R_1$ is hydrogen or alkyl (e.g., an alkyl having 1 to 10 carbon atoms, 1 to 6 carbon atoms, or 1 to 4 carbon atoms).

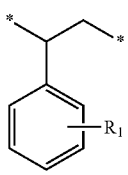

(III)

Each weight percent value is based on the total weight of monomeric units in the precursor polymeric sorbent.

Some embodiments of the precursor polymeric material contain 10 to 40 weight percent of the first monomeric units of Formula (I), 50 to 75 weight percent of the monomeric units of Formula (II), and 1 to 20 weight percent of the styrene-type monomeric units of Formula (III). In other embodiments, the precursor polymeric material contains 15 to 35 weight percent of the first monomeric units of Formula (I), 55 to 75 weight percent of the monomeric units of Formula (II), and 1 to 20 weight percent monomeric units of Formula (III). In still other embodiments, the precursor polymeric material contains 20 to 30 weight percent of the first monomeric units of Formula (I), 55 to 75 weight percent of the monomeric units of Formula (II), and 1 to 20 weight percent of the styrene-type monomeric units of Formula (III). In further embodiments, the precursor polymeric material contains 20 to 35 weight percent of the first monomeric units of Formula (I), 55 to 70 weight percent of the monomeric units of Formula (II), and 1 to 20 weight percent of the styrene-type monomeric units of Formula (III). In still further embodiments, the precursor polymeric material contains 20 to 40 weight percent of the first monomeric units of Formula (I), 50 to 70 weight percent of the monomeric units of Formula (II), and 5 to 20 weight percent of the styrene-type monomeric units of Formula (III). The weight percent values are based on the total weight of monomeric units in the precursor polymeric material.

The polymeric sorbent is formed by reacting the precursor polymeric material with a nitrogen-containing compound. The nitrogen-containing compound, which is usually basic, reacts with the anhydride group in the precursor polymeric material. That is, the nitrogen-containing compound reacts with the monomeric units of Formula (I) within the precursor polymeric material. This reaction results in the formation of a covalent bond linking the nitrogen-containing compound to the polymeric material.

The nitrogen-containing compound is ammonia, a compound having a single primary amino group (—NH$_2$), or a compound having at least two amino groups of formula (—NHR) where R is hydrogen or alkyl. The nitrogen-containing compounds having a single primary amino group is a primary amine compound and typically does not include other primary and/or secondary amino groups. That is, there is a single nitrogen-containing group and it is —NH$_2$. The nitrogen-containing compound having at least two amino groups of formula —NHR can have two or more primary amino groups (where R is equal to hydrogen), can have two or more secondary amino groups (where R is equal to an alkyl), or can have at least one primary amino group plus at least one secondary amino group.

Many suitable nitrogen-containing compounds are of Formula (IV).

$$R_3NHR_2 \qquad (IV)$$

In Formula (IV), the group $R_2$ is hydrogen or an alkyl. The group $R_3$ is hydrogen, alkyl, a group of formula —R$_4$—NHR$_5$, or —(C=NH)—NH$_2$. The group $R_4$ is a covalent bond, an alkylene, an arylene, an aralkylene, a heteroalkylene having one or more oxy (—O—) groups, or a heteroalkylene having one or more —NH— groups. The group $R_5$ is hydrogen, alkyl, or —(C=NH)—NH$_2$.

Formula (IV) is equal to ammonia when both $R_2$ and $R_3$ are hydrogen. Formula (IV) is equal to a compound having a single primary amino group when $R_2$ is hydrogen and $R_3$ is alkyl. Formula (IV) is equal to a compound having two or more groups of formula —NHR when $R_3$ is —R$_4$—NHR$_5$ or when $R_3$ is —(C=NH)—NH$_2$.

Suitable alkyl groups for $R_2$ in Formula (IV) can have at least 1 carbon atom, at least 2 carbon atoms, or at least 4 carbon atoms and can have up to 20 carbon atoms, up to 18 carbon atoms, up to 12 carbon atoms, up to 10 carbon atoms, or up to 6 carbon atoms. In some embodiments, the alkyl has 1 to 10 carbon atoms, 1 to 6 carbon atoms, or 1 to 4 carbon atoms.

In some embodiments, $R_3$ in Formula (IV) is an alkyl. To be suitable as a nitrogen-containing compound, $R_2$ is equal to hydrogen when $R_3$ is an alkyl. That is, the compound of Formula (IV) is a primary amine compound. Suitable alkyl groups for $R_3$ often have at least 1 carbon atom, at least 2 carbon atoms, or at least 4 carbon atoms and can have up to 20 carbon atoms, up to 18 carbon atoms, up to 12 carbon atoms, up to 10 carbon atoms, or up to 6 carbon atoms. In some embodiments, the alkyl has 1 to 10 carbon atoms, 1 to 6 carbon atoms, or 1 to 4 carbon atoms. Examples of suitable primary amine compounds include, but are not limited to, methylamine, ethylamine, propylamine, butylamine, and cyclohexylamine.

In some embodiments, $R_3$ in Formula (IV) is a group of formula —R$_4$—NHR$_5$ and the nitrogen-containing compound is of Formula (IV-1).

$$R_5HN—R_4—NHR_2 \qquad (IV\text{-}1)$$

Such compounds have at least two groups of formula —NHR. Suitable alkyl groups for $R_5$ in Formula (IV-1) can have at least 1 carbon atom, at least 2 carbon atoms, or at least 4 carbon atoms and can have up to 20 carbon atoms, up to 18 carbon atoms, up to 12 carbon atoms, up to 10 carbon atoms, or up to 6 carbon atoms. In some embodiments, the alkyl has 1 to 10 carbon atoms, 1 to 6 carbon atoms, or 1 to 4 carbon atoms. The group $R_4$ can be a covalent bond (i.e., the nitrogen-containing compound is a hydrazine compound), an alkylene, an arylene, an aralkylene, a heteroalkylene having one or more oxy (—O—) groups, or a heteroalkylene having one or more —NH— groups.

Suitable alkylene (i.e., an alkylene is a divalent radical of an alkane) $R_4$ groups in Formula (IV-1) usually have at least 1 carbon atom, at least 2 carbon atoms, at least 3 carbon atoms, or at least 4 carbon atoms and can have up to 20 carbon atoms, up to 16 carbon atoms, up to 12 carbon atoms, up to 10 carbon atoms, or up to 6 carbon atoms. Some nitrogen-containing compounds are of Formula (IV-1) with $R_2$ being hydrogen and $R_4$ being an alkylene, and $R_5$ being hydrogen. Examples of such nitrogen-containing compounds are alkylene diamines such as, for example, methylene diamine, ethylene diamine, propylene diamine, and butylene diamine. Nitrogen-containing compounds of Formula (IV-1) having both $R_2$ and $R_5$ equal to alkyl include N,N'-dimethylethylene diamine.

In other embodiments of the compounds of Formula (IV-1), the group $R_4$ is a heteroalkylene (i.e., a heteroalkylene is a divalent radical of a heteroalkane, which is an alkane having catenary heteroatoms) having at least one catenary —O— or —NH— group. Stated differently, heteroalkylene $R_4$ groups have one or more groups of formula —$R_a$—[O—$R_b$]$_n$— or —$R_a$—[NH—$R_b$]$_n$— where each $R_a$ and each $R_b$ are independently an alkylene and n is an integer in a range of 1 to 50, 1 to 40, 1 to 30, 1 to 20, 1 to 10, 1 to 6, or 1 to 4. Suitable $R_a$ and $R_b$ alkylene groups often have 1 to 10 carbon atoms, 1 to 6 carbon atoms, 1 to 4 carbon atoms, or 1 to 3 carbon atoms. The heteroalkylene often has up to 30 carbon atoms and up to 16 heteroatoms, up to 20 carbon atoms and up to 11 heteroatoms, or up to 10 carbon atoms and up to 6 heteroatoms. Such nitrogen-containing compounds can be represented by Formulas (IV-2) and (IV-3).

$$R_5HN—R_a—[O—R_b]_n—NHR_2 \qquad (IV-2)$$

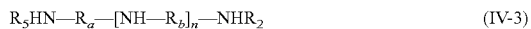
$$R_5HN—R_a—[NH—R_b]_n—NHR_2 \qquad (IV-3)$$

Some nitrogen-containing compounds are of Formula (IV-2) with $R_2$ being hydrogen, $R_4$ being a heteroalkylene with —O— groups, and $R_5$ being hydrogen. Examples of such nitrogen-containing compounds are poly(alkylene oxide) diamines such as polyethylene glycol diamine and polypropylene glycol diamine. Further nitrogen-containing compounds are of Formula (IV-3) with $R_2$ being hydrogen, $R_4$ (in Formula (IV-1)) being a heteroalkylene with —NH— groups, and $R_5$ being hydrogen. Such nitrogen-containing compounds can be, for example, compounds of formula $H_2N—[(CH_2)_xNH]_y—(CH_2)_xNH_2$ where x is an integer in a range of 1 to 4 and y is in a range of 1 to 10. Examples include diethylene triamine, triethylene tetramine, and tetraethylene pentamine.

The $R_4$ group in Formula (IV-1) can also be an arylene or aralkylene group. Suitable arylene (i.e., divalent radical of a carbocylic aromatic compound) $R_4$ groups typically have 6 to 12 carbons and are often phenylene or diphenylene. Suitable aralkylene $R_4$ groups refer to divalent groups that have an alkylene substituted by an aryl group, an arylene substituted with an alkyl group, or an arylene bonded to an alkylene group. The alkylene or alkyl portion of the aralkylene often has 1 to 10 carbon atoms, 1 to 6 carbon atoms, or 1 to 4 carbon atoms. The aryl or arylene portion of the aralkylene often has 6 to 12 carbon atoms and is often either phenyl or phenylene. Example nitrogen-containing compounds of Formula (IV-1) with both $R_2$ and $R_5$ being hydrogen and $R_4$ being arylene include, but are not limited to, phenylene diamine.

Yet other nitrogen-containing compounds are of Formula (IV-1) with $R_5$ being —(C=NH)—$NH_2$ as shown in Formula (IV-4).

$$NH_2—(C=NH)—HN—R_4—NHR_2 \qquad (IV-4)$$

For example, in some compounds, $R_2$ is hydrogen and $R_4$ is alkylene. One such compound is agmatine. Agmatine can be represented by other resonance structures as well but is considered to be within the scope of both Formula (IV-1) and (IV-4).

In other embodiments of Formula (IV), $R_3$ is a group —(C=NH)—$NH_2$. The resulting compounds are of Formula (IV-5).

$$H_2N—(C=NH)—NHR_2 \qquad (IV-5)$$

This compound is guanidine when $R_2$ is hydrogen.

Other suitable nitrogen-containing compounds are polyamines having at least three groups of formula —$NHR_2$, where $R_2$ is hydrogen or alkyl. Such compounds can be of Formula (V).

$$R_6—(NHR_2)_z \qquad (V)$$

In Formula (V), $R_2$ is defined as above and the variable z is equal to at least 3 and can be up to 10, up to 8, up to 6, or up to 4. The $R_6$ group is often a z-valent radical of an alkane or a z-valent radical of a heteroalkane. Suitable z-valent radicals of alkanes often have a branching carbon atom with at least three of the four adjacent groups being —$CH_2$—. Suitable z-valent radicals of heteroalkanes often have a branching nitrogen atom with three adjacent carbon atoms (e.g., three adjacent groups that are alkylene or alkyl groups) or a branching carbon atom with at least three of the four adjacent atoms being carbon (e.g., three adjacent groups that are alkylene or alkyl groups). These z-valent radicals of heteroalkanes often include one or more groups of formula —$R_c$—[NH—$R_d$]$_p$— where each $R_c$ and each $R_d$ are independently an alkylene and p is an integer in a range of 1 to 50, 1 to 40, 1 to 30, 1 to 20, 1 to 10, 1 to 6, or 1 to 4. Suitable $R_c$ and $R_d$ alkylene groups often have 1 to 10 carbon atoms, 1 to 6 carbon atoms, 1 to 4 carbon atoms, or 1 to 3 carbon atoms. The z-valent radicals of alkanes often have at least 2 carbon atoms, at least 3 carbon atoms, at least 4 carbon atoms, or at least 5 carbon atoms and up to 20 carbon atoms, up to 16 carbon atoms, up to 12 carbon atoms, or up to 8 carbon atoms. The z-valent radicals of heteroalkanes often have up to 30 carbon atoms and up to 16 heteroatoms, up to 20 carbon atoms and up to 11 heteroatoms, or up to 10 carbon atoms and up to 6 heteroatoms.

Specific polyamines of formula $R_6—(NHR_2)_z$ include various polyimines. Some polyimines include one or more branching nitrogen atoms with each nitrogen-branching atom connected to three groups of formula —$R_c$—[NH—$R_d$]$_p$—. The end group of each branched segment is often a group of formula —$NHR_2$ such as —$NH_2$. Examples include various branched polyethyleneimines. Another specific polyamine is 2-(aminomethyl)-2-methyl-1,3-propanediamine where $R_6$ is a trivalent radical of an alkane (i.e., the carbon branching atom is connected to four carbon atoms with three adjacent alkylene groups and one adjacent methyl group), each $R_2$ is hydrogen, and z is equal to 3.

In many embodiments, the nitrogen-containing compounds such as those of Formula (IV) (including Formula (IV-1) to (IV-5)) and Formula (V) have a molecular weight (or weight average molecular weight) that is no greater than 2000 Daltons (Da). For example, the molecular weight (or weight average molecular weight) is no greater than 1500

Da, no greater than 1000 Da, no greater than 750 Da, no greater than 500 Da, or no greater than 250 Da.

The nitrogen-containing compound reacts with the monomeric units of Formula (I) in the precursor polymeric material. This reaction results in the covalent bonding of the nitrogen-containing compound to the polymeric material with the reaction sites being the anhydride group (—(CO)—O—(CO)—) in the monomeric unit of Formula (I). The ring structure is typically opened forming monomeric units of Formula (VI), Formula (VII), or a mixture thereof.

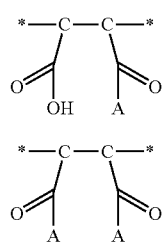

In Formulas (VI) and (VII), group A is equal to —$NR_2R_3$ if a nitrogen-containing compound of Formula (IV) is used and is equal to —$NR_2$—$R_6(NHR_2)_{z-1}$ if a nitrogen-containing compound of Formula (V) is used. Alternatively, a ring structure could possibly form such as shown in Formula (VIII) where $A_1$ is a divalent group and is equal to the compound of Formula (IV) or to the compound of Formula (V) minus two hydrogen atoms.

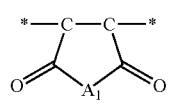

Up to two moles of nitrogen-containing compound can be added for every mole of monomeric units of Formula (I) in the precursor polymeric material. That is, up to 200 mole percent nitrogen-containing compound can react with the precursor polymeric material based on the total moles of monomeric units of Formula (I). In some embodiments, the amount of nitrogen-containing compound added is up to 175 mole percent, up to 150 mole percent, up to 125 mole percent, or up to 100 mole percent based on the total moles of monomeric units of Formula (I) in the precursor polymeric material. The amount of the nitrogen-containing compound can be at least 1 mole percent, at least 2 mole percent, at least 5 mole percent, at least 10 mole percent, at least 20 mole percent, at least 50 mole percent, at least 75 mole percent, or at least 100 mole percent based on the total moles of monomeric units of Formula (I) in the precursor polymeric material. In some embodiments, the amount of nitrogen-containing compound is in a range of 1 to 200 mole percent, in a range of 10 to 200 mole percent, in a range of 50 to 200 mole percent, in a range of 50 to 150 mole percent, a range of 75 to 150 mole percent, in a range of 75 to 125 mole percent, or in a range of 100 to 200 mole percent based on the total moles of monomeric units of Formula (I) in the precursor polymeric material.

To react the nitrogen-containing compound with the precursor polymeric material, the nitrogen-containing compound is often dissolved in water and/or a suitable organic solvent. Suitable organic solvents are those that dissolve but do not react with the nitrogen-containing compound. Exemplary organic solvents include, but are not limited to, alcohols, ethers such as tetrahydrofuran and diethyl ether, and various chlorinated solvents such as methylene chloride and chloroform. The concentration of the nitrogen-containing compound in water and/or organic solvent can be any suitable amount depending on the solubility of the nitrogen-containing compound. In some embodiments, the concentration of the nitrogen-containing compound in water and/or organic solvent is in a range of 1 to 40 weight percent, in a range of 1 to 30 weight percent, in a range of 1 to 20 weight percent, or in a range of 1 to 10 weight percent.

The solution of the nitrogen-containing compound is mixed with the precursor polymeric material. The reaction between the nitrogen-containing compounds and the monomeric units of Formula (I) can occur at room temperature or can occur by heating the mixture to a temperature above room temperature. For example, the mixture can be heated at temperatures in a range of 30 to 120° C. for several hours to several days. In some embodiments, the suspension is heated at 30 to 100° C., 40 to 90° C., 50 to 90° C., or 60 to 80° C. for 12 to 24 hours.

The polymeric sorbent typically has a BET specific surface area that is less than that of the precursor polymeric material. The opening of the anhydride group to form the monomeric units of Formula (VI) and (VII) may sufficiently increase the conformational freedom in the backbone resulting in decreased porosity. In addition, hydrogen bonding between the nitrogen-containing groups in the monomeric units of Formula (VI), (VII), and (VIII) could possibly restrict or block access to pores. Because of this decrease, it is often desirable to prepare a precursor polymeric material having the highest possible BET specific surface area yet having sufficient anhydride groups to react with the nitrogen-containing compound.

The polymeric sorbent typically has a BET specific surface area equal to at least 250 $m^2$/gram. In some embodiments, the BET specific surface area is at least 275 $m^2$/gram, at least 300 $m^2$/gram, at least 325 $m^2$/gram, at least 350 $m^2$/gram, at least 400 $m^2$/gram, or at least 450 $m^2$/gram. The BET specific surface area can be up to 900 $m^2$/gram or higher, up to 800 $m^2$/gram, up to 750 $m^2$/gram, or up to 700 $m^2$/gram. In some embodiments, the BET specific surface area is in a range of 250 to 900 $m^2$/gram, in a range of 300 to 800 $m^2$/gram, in a range of 300 to 700 $m^2$/gram, or in a range of 350 to 600 $m^2$/gram.

Figure 3:
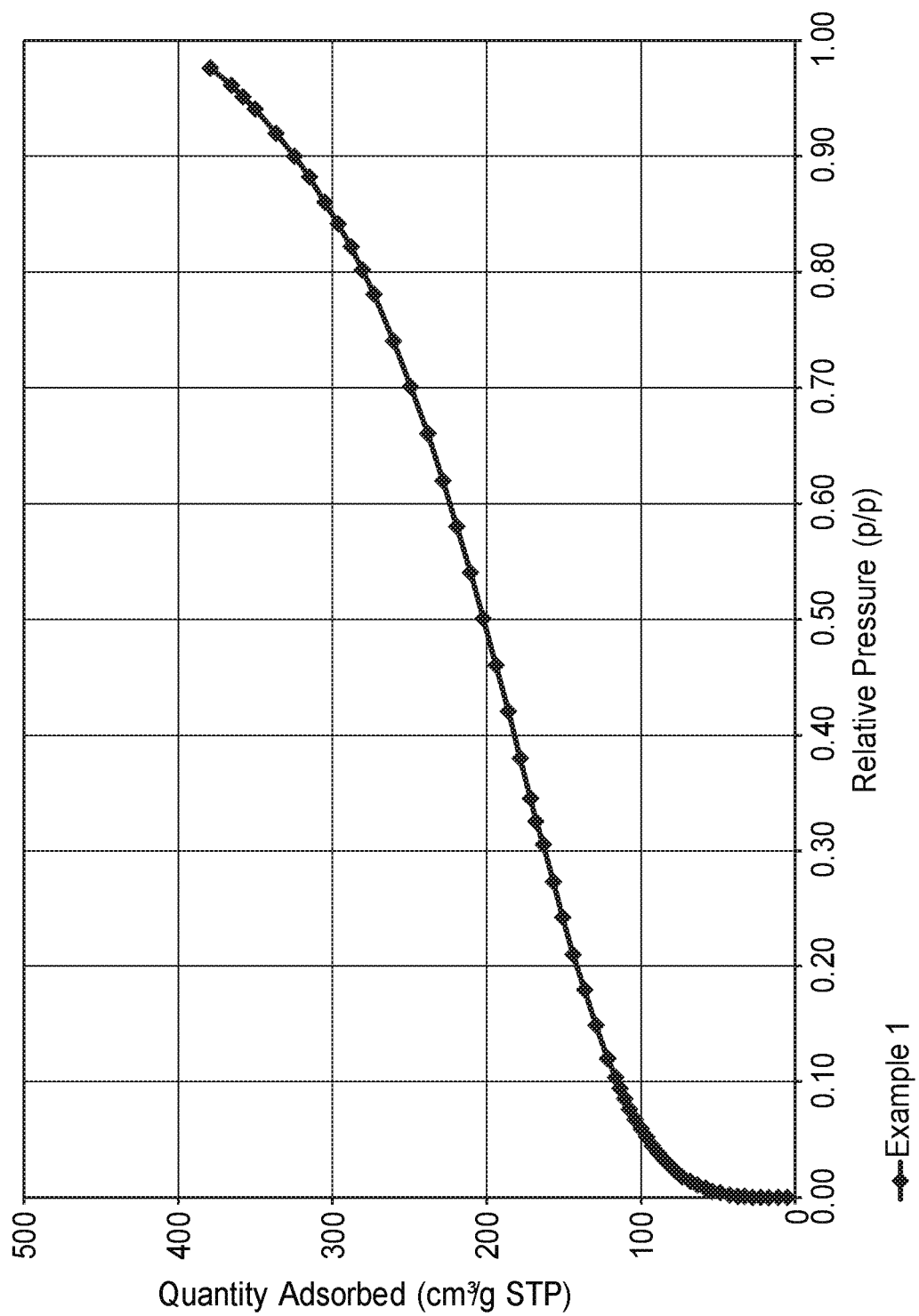
FIG. 3 is the argon adsorption isotherm at 77° K and at relative pressures up to 0.98±0.01 for the exemplary porous polymeric sorbent of Example 1.

The high BET specific surface area is at least partially attributable to the presence of micropores and/or mesopores in the polymeric sorbent. The argon adsorption isotherms (at 77° K) of the polymeric sorbent indicate that there is considerable adsorption of argon at relative pressures below 0.1, which suggests that micropores are present. There is a gradual increase in adsorption at relative pressures between 0.1 and about 0.95. This increase is indicative of a wide size distribution of mesopores. An argon adsorption isotherm is shown in FIG. 3 for an example polymeric sorbent.

In some embodiments, at least 20 percent of the BET specific surface area of the polymeric sorbent is attributable to the presence of micropores and/or mesopores. The percentage of the BET specific surface area attributable to the presence of micropores and/or mesopores can be at least 25 percent, at least 30 percent, at least 40 percent, at least 50 percent, or at least 60 percent. In some embodiments, the percentage of the BET specific surface area attributable to the presence of micropores and/or mesopores can be up to 90 percent or higher, up to 80 percent or higher, or up to 75 percent or higher.

The porous polymeric sorbent has the total pore volume equal to at least 0.20 cm$^3$/gram. Total pore volume is calculated from the amount of argon adsorbed at liquid nitrogen temperature (77° K) at a relative pressure (p/p°) equal to approximately 0.98 (i.e., 0.98±0.01). In some embodiments, the total pore volume is at least 0.25 cm$^3$/gram, at least 0.30 cm$^3$/grams, at least 0.40 cm$^3$/gram, at least 0.50 cm$^3$/gram, or at least 0.60 cm$^3$/gram. The total pore volume can be up to 1.0 cm$^3$/gram or even higher, up to 0.9 cm$^3$/gram, up to 0.8 cm$^3$/gram, or up to 0.7 cm$^3$/gram.

The structure of the divinylbenzene/maleic anhydride polymeric material is particularly well suited for use as a precursor polymeric material for the porous polymeric sorbent. Providing that the content of monomeric units of Formula (III) from styrene-type monomers is low, the divinylbenzene/maleic anhydride precursor polymeric material has alternating monomeric units from divinylbenzene and maleic anhydride. This structure results in high crosslinking and contributes to the formation of a porous polymeric material, particularly a porous polymeric material having a high content of micropores and/or mesopores. The replacement of maleic anhydride with an ethylenically unsaturated monomer (e.g., (meth)acrylic acid or ester of (meth)acrylic acid) may not result in the formation of a polymeric material that has such high BET specific surface area and a large pore volume.

In another aspect, a method of sorbing carbon dioxide on a polymeric sorbent is provided. The method includes providing a polymeric sorbent and then sorbing carbon dioxide on the polymeric sorbent. The polymeric sorbent is a reaction product of (a) a precursor polymeric material and (b) a nitrogen-containing compound. The precursor polymeric material comprises a polymerized product of a polymerizable composition containing (1) 8 to 40 weight percent maleic anhydride based on the total weight of monomers in the polymerizable composition, (2) 48 to 75 weight percent divinylbenzene based on the total weight of monomers in the polymerizable composition, and (3) 0 to 20 weight percent of a styrene-type monomer based on the total weight of monomers in the polymerizable composition, wherein the styrene-type monomer is styrene, an alkyl-substituted styrene, or a combination thereof. The nitrogen-containing compound is selected from ammonia, a compound having a single primary amino group (—NH$_2$), or a compound having at least two amino groups of formula —NHR where R is hydrogen or alkyl.

The porous polymeric sorbent sorbs carbon dioxide. Thus, in yet another aspect, a composition is provided that includes the porous polymeric sorbent and carbon dioxide sorbed on the porous polymeric sorbent. The polymeric sorbent is the same as described above. The carbon dioxide can be sorbed at room temperature or at any desired temperature such as in a range of –30° C. to 150° C. or in a range of –20° C. to 50° C.

The amount of carbon dioxide that sorbs on the porous polymeric sorbent tends to increase with pressure. For example, the amount of carbon dioxide sorbed in mmoles/gram at room temperature (e.g., 25° C.) and 20 bar is often at least 2.5 times greater than the amount sorbed in mmoles/gram at room temperature (e.g., 25° C.) and 1 bar. That is, the ratio of the amount sorbed in mmoles/gram at room temperature (e.g., 25° C.) and 20 bar to the amount sorbed in mmoles/gram at room temperature (e.g., 25° C.) and 1 bar is at least 2.5. For example, this ratio can be at least 3, at least 4, or at least 5 and can be up to 10 or more, up to 9, up to 8, or up to 7.

Stated differently, the difference in the amount of carbon dioxide sorbed at room temperature (e.g., 25° C.) and 20 bar and the amount of carbon dioxide sorbed at room temperature (e.g., 25° C.) and 1 bar is often at least 1.5 mmoles/gram or at least 2 mmoles/gram. This amount can be up to 10 mmoles/gram, up to 8 mmoles/gram, up to 6 mmoles/gram, or up to 4 mmoles/gram.

The amount of carbon dioxide sorbed at room temperature (e.g., 25° C.) and 20 bar is often at least 2 mmoles/gram, at least 2.5 mmoles/gram, at least 3 mmoles/gram, at least 3.5 mmoles/gram, at least 4 mmoles/gram, at least 4.5 mmoles/gram, at least 5 mmoles/gram, at least 5.5 mmoles/gram, at least 6 mmoles/gram, at least 7 mmoles/gram, at least 8 mmoles/gram, or at least 10 mmoles/gram.

The amount of carbon dioxide sorbed at room temperature (e.g., 25° C.) and 20 bar is often at least 10 weight percent based on the weight of the polymeric sorbent. The amount sorbed can be at least 12 weight percent, at least 14 weight percent, at least 16 weight percent, at least 18 weight percent, at least 20 weight percent, at least 22 weight percent, at least 24 weight percent, at least 25 weight percent, at least 30 weight percent, at least 35 weight percent, at least 40 weight percent, or at least 45 weight percent.

FIG. 1 is a plot showing the adsorption and desorption of both carbon dioxide and methane at pressures up to about 20 bar at 25° C. for an example porous polymeric sorbent. There is only a small amount of hysteresis between the adsorption and desorption curves. This may suggest that the pores of the polymeric sorbent can be both filled and emptied easily with either carbon dioxide or methane. The amount of carbon dioxide that is sorbed at a first pressure such as, for example, at 20 bar or even greater can be reduced substantially by simply decreasing the pressure to a second pressure that is lower than the first pressure. The second pressure is often greater than or equal to 1 bar or ambient pressure. No vacuum or heat is needed to substantially reduce the amount of carbon dioxide sorbed on the porous polymeric sorbent at room temperature (e.g., 25° C.). For example, the amount of carbon dioxide sorbed at room temperature (e.g., 25° C.) and 20 bar can be reduced by at least 60 weight percent by lowering the pressure to about 1 bar. Stated differently, 60 percent of the carbon dioxide sorbed at room temperature and 20 bar on the polymeric sorbent is removed from the polymeric sorbent by lowering the pressure to 1 bar at room temperature. In some examples, the amount or carbon dioxide reduced is at least 70 weight percent, at least 80 weight percent, or at least 90 weight percent. The porous polymeric sorbent can be used repeatedly to sorb and to desorb carbon dioxide by cycling the pressure from a first pressure such as, for example, about 20 bar to a second pressure such as, for example, about 1 bar.

The polymeric sorbent selectively sorbs carbon dioxide over methane. For example, the amount of sorbed carbon dioxide at room temperature (e.g., 25° C.) and 20 bar is often at least 2 times greater than the amount of sorbed methane at room temperature (e.g., 25° C.) and 20 bar. That is, the ratio of the amount of carbon dioxide (in mmoles/gram) to the amount of methane (in mmoles/gram) sorbed at room temperature (e.g., 25° C.) and 20 bar is at least 2. For example, this ratio can be at least 2.5, at least 3, at least 3.5, at least 4, at least 4.5, or at least 5 and can be up to 10, up to 8, or up to 6. Selectivity for the sorption of carbon dioxide over hydrogen is expected to be at least as good as the selectivity for the sorption of carbon dioxide over methane.

Other hyper-crosslinked polymeric materials that have been used for sorption of carbon dioxide have no functional groups. More specifically, these previously used polymeric materials are aromatic hydrocarbon-based sorbents. While such polymeric materials are likely to have low water sorption, they may not be as effective as the porous polymeric sorbents described herein that have amine groups. Although not wishing to be bound by theory, the amine groups may facilitate solubility of the carbon dioxide within the porous polymeric sorbents. That is, sorption may occur by a combination of pore filling and swelling of the porous polymeric sorbent. While not wishing to be bound by theory, the carbon dioxide may interact with the porous polymeric sorbent through hydrogen bonding or by chemically reacting with the nitrogen-containing compound that is covalently attached to the polymeric material.

Various embodiments are provided that are a polymeric sorbent, a method of making the polymeric sorbent, a method of sorbing carbon dioxide on a polymeric sorbent, or a composition comprising a polymeric sorbent and carbon dioxide sorbed on the polymeric sorbent.

Embodiment 1A is a polymeric sorbent. The polymeric sorbent is a reaction product of (a) a precursor polymeric material and (b) a nitrogen-containing compound. The precursor polymeric material comprises a polymerized product of a polymerizable composition containing (1) 8 to 40 weight percent maleic anhydride based on the total weight of monomers in the polymerizable composition, (2) 48 to 75 weight percent divinylbenzene based on the total weight of monomers in the polymerizable composition, and (3) 0 to 20 weight percent of a styrene-type monomer based on the total weight of monomers in the polymerizable composition, wherein the styrene-type monomer is styrene, an alkyl-substituted styrene, or a combination thereof. The nitrogen-containing compound is selected from ammonia, a compound having a single primary amino group (—$NH_2$), or a compound having at least two amino groups of formula —NHR where R is hydrogen or alkyl.

Embodiment 2A is the polymeric sorbent of embodiment 1A, wherein the polymeric sorbent has a BET specific surface area equal to at least 250 $m^2$/gram.

Embodiment 3A is the polymeric sorbent of embodiment 1A or 2A, wherein the polymeric sorbent has a BET specific surface area in a range of 250 $m^2$/gram to 900 $m^2$/gram.

Embodiment 4A is the polymeric sorbent of any one of embodiments 1A to 3A, wherein the polymerizable composition comprises 10 to 40 weight percent maleic anhydride, 50 to 75 weight percent divinylbenzene, and 1 to 20 weight percent styrene-type monomers. The weight percent values are based on the total weight of monomers in the polymerizable composition used to form the precursor polymeric material.

Embodiment 5A is the polymeric sorbent of any one of embodiments 1A to 4A, wherein the polymerizable composition comprises 15 to 35 weight percent maleic anhydride, 55 to 75 weight percent divinylbenzene, and 1 to 20 weight percent styrene-type monomers. The weight percent values are based on the total weight of monomers in the polymerizable composition used to form the precursor polymeric material.

Embodiment 6A is the polymeric sorbent of any one of embodiments 1A to 5A, wherein the polymerizable composition comprises 20 to 30 weight percent maleic anhydride, 55 to 75 weight percent divinylbenzene, and 1 to 20 weight percent styrene-type monomer. The weight percent values are based on the total weight of monomers in the polymerizable composition used to form the precursor polymeric material.

Embodiment 7A is the polymeric sorbent of any one of embodiments 1A to 6A, wherein the polymerizable composition comprises 20 to 35 weight percent maleic anhydride, 55 to 70 weight percent divinylbenzene, and 1 to 20 weight percent styrene-type monomers. The weight percent values are based on the total weight of monomers in the polymerizable composition used to form the precursor polymeric material.

Embodiment 8A is the polymeric sorbent of any one of embodiments 1A to 7A, wherein the polymerizable composition contains 20 to 40 weight percent maleic anhydride, 50 to 70 weight percent divinylbenzene, and 5 to 20 weight percent styrene-type monomer. The weight percent values are based on the total weight of monomers in the polymerizable composition used to form the precursor polymeric material.

Embodiment 9A is the polymeric sorbent of any one of embodiments 1A to 8A, wherein the nitrogen-containing compound has a molecular weight no greater than 2000 Daltons.

Embodiment 10A is the polymeric sorbent of any one of embodiments 1A to 9A, wherein the nitrogen-containing compound is of Formula (IV).

$$R_3NHR_2 \qquad (IV)$$

In Formula (IV), the group $R_2$ is hydrogen or an alkyl. The group $R_3$ is hydrogen, an alkyl, a group of formula —$R_4$—$NHR_5$, or —(C=NH)—$NH_2$. The group $R_4$ is a covalent bond, an alkylene, an arylene, an aralkylene, a heteroalkylene having one or more oxy (—O—) groups, or a heteroalkylene having one or more —NH— groups. The group $R_5$ is hydrogen, alkyl, or —(C=NH)—$NH_2$.

Embodiment 11A is the polymeric sorbent of embodiment 10A, wherein $R_3$ is a group of formula —$R_4$—$NHR_5$ and the nitrogen-containing compound is of Formula (IV-1).

$$R_5HN—R_4—NHR_2 \qquad (IV-1)$$

Embodiment 12A is the polymeric sorbent of embodiment 11A, wherein the group $R_4$ is a covalent bond or an alkylene.

Embodiment 13A is the polymeric sorbent of 11A, wherein the group $R_4$ is a heteroalkylene having at least one catenary —O— or —NH— group.

Embodiment 14A is the polymeric sorbent of 13A, wherein the nitrogen-containing compound is of Formula (IV-2) or (IV-3)

$$R_5HN—R_a—[O—R_b]_n—NHR_2 \qquad (IV-2)$$

$$R_5HN—R_a—[NH—R_b]_n—NHR_2 \qquad (IV-3)$$

wherein each $R_a$ and each $R_b$ are independently an alkylene and n is an integer in a range of 1 to 50.

Embodiment 15A is the polymeric sorbent of embodiment 13A or 14A, wherein the nitrogen-containing compound is of formula $H_2N$—[$(CH_2)_xNH$]$_y$—$(CH_2)_xNH_2$ where x is an integer in a range of 1 to 4 and y is in a range of 1 to 10.

Embodiment 16A is the polymeric sorbent of embodiment 10A, wherein the nitrogen-containing compound is of Formula (IV-4) or (IV-5)

$$NH_2—(C=NH)—HN—R_4—NHR_2 \qquad (IV-4)$$

$$H_2N—(C=NH)—NHR_2 \qquad (IV-5)$$

wherein group $R_4$ is alkylene.

Embodiment 17A is the polymeric material of any one of embodiment 1A to 11A, wherein the nitrogen-containing compound is ammonia, alkylamine, or alkylene diamine.

Embodiment 18A is the polymeric material of any one of embodiments 1A to 11A, wherein the nitrogen-containing compound is a poly(alkylene oxide) diamine.

Embodiment 19A is the polymeric material of any one of embodiments 1A to 11A, wherein the nitrogen-containing compound is phenylene diamine, diethylene triamine, triethylene tetramine, tetraethylene pentamine, N,N'-dimethylethylene diamine, hydrazine, agmatine, or guanidine.

Embodiment 20A is the polymeric sorbent of any one of embodiments 1A to 9A, wherein the nitrogen-containing compound is of Formula (V).

$$R_6-(NHR_2)_z \quad (V)$$

In Formula (V), $R_6$ is a z-valent radical of an alkane or a z-valent radical of a heteroalkane.

Embodiment 21A is the polymeric sorbent of embodiment 20A, wherein the nitrogen-containing compound is polyethylene imine or 2-(aminomethyl)-2-methyl-1,3-propanediamine.

Embodiment 22A is the polymeric sorbent of any one of embodiments 1A to 21A, wherein the porous polymeric sorbent has the total pore volume of at least 0.20 cm$^3$/gram, the total pore volume being measured by adsorbing argon at 77° K at a relative pressure equal to 0.98±0.01.

Embodiment 23A is the polymeric sorbent of embodiments 1A to 22A, wherein the total pore volume is at least 0.25 cm$^3$/gram or at least 0.30 cm$^3$/gram.

Embodiment 24A is the polymeric sorbent of any one of embodiments 1A to 23A, wherein the BET specific surface area of the porous polymeric sorbent is at least 300 m$^2$/gram.

Embodiment 25A is the polymeric sorbent of any one of embodiments 1A to 24A, wherein the BET specific surface area of the porous polymeric sorbent is at least 350 m$^2$/gram.

Embodiment 26A is the polymeric sorbent of any one of embodiments 1A to 25A, wherein at least 20 percent of the BET specific surface area is attributable to micropores, mesopores, or a combination thereof.

Embodiment 27A is the polymeric sorbent of any one of embodiments 1A to 26A, wherein at least 50 percent of the BET specific surface area is attributable to micropores, mesopores, or a combination thereof.

Embodiment 28A is the polymeric sorbent of any one of embodiments 1A to 27A, wherein at least 95 weight percent of the monomers in the polymerizable composition are selected from maleic anhydride, divinylbenzene, and styrene-type monomers.

Embodiment 1B is a method of sorbing carbon dioxide on a polymeric sorbent. The method includes providing a polymeric sorbent and then sorbing carbon dioxide on the polymeric sorbent. The polymeric sorbent is a reaction product of (a) a precursor polymeric material and (b) a nitrogen-containing compound. The precursor polymeric material comprises a polymerized product of a polymerizable composition containing (1) 8 to 40 weight percent maleic anhydride based on the total weight of monomers in the polymerizable composition, (2) 48 to 75 weight percent divinylbenzene based on the total weight of monomers in the polymerizable composition, and (3) 0 to 20 weight percent of a styrene-type monomer based on the total weight of monomers in the polymerizable composition, wherein the styrene-type monomer is styrene, an alkyl-substituted styrene, or a combination thereof. The nitrogen-containing compound is selected from ammonia, a compound having a single primary amino group (—NH$_2$), or a compound having at least two groups of formula —NHR where R is hydrogen or alkyl.

Embodiment 2B is the method of embodiment 1B, wherein the polymeric sorbent has a BET specific surface area equal to at least 250 m$^2$/gram.

Embodiment 3B is the method of embodiment 1B or 2B, wherein the polymeric sorbent has a BET specific surface area in a range of 250 m$^2$/gram to 900 m$^2$/gram.

Embodiment 4B is the method of any one of embodiments 1B to 3B, wherein the polymerizable composition comprises 10 to 40 weight percent maleic anhydride, 50 to 75 weight percent divinylbenzene, and 1 to 20 weight percent styrene-type monomers. The weight percent values are based on the total weight of monomers in the polymerizable composition used to form the precursor polymeric material.

Embodiment 5B is the method of any one of embodiments 1B to 4B, wherein the polymerizable composition comprises 15 to 35 weight percent maleic anhydride, 55 to 75 weight percent divinylbenzene, and 1 to 20 weight percent styrene-type monomers. The weight percent values are based on the total weight of monomers in the polymerizable composition used to form the precursor polymeric material.

Embodiment 6B is the method of any one of embodiments 1B to 5B, wherein the polymerizable composition comprises 20 to 30 weight percent maleic anhydride, 55 to 75 weight percent divinylbenzene, and 1 to 20 weight percent styrene-type monomer. The weight percent values are based on the total weight of monomers in the polymerizable composition used to form the precursor polymeric material.

Embodiment 7B is the method of any one of embodiments 1B to 6B, wherein the polymerizable composition comprises 20 to 35 weight percent maleic anhydride, 55 to 70 weight percent divinylbenzene, and 1 to 20 weight percent styrene-type monomers. The weight percent values are based on the total weight of monomers in the polymerizable composition used to form the precursor polymeric material.

Embodiment 8B is the method of any one of embodiments 1B to 7B, wherein the polymerizable composition contains 20 to 40 weight percent maleic anhydride, 50 to 70 weight percent divinylbenzene, and 5 to 20 weight percent styrene-type monomer. The weight percent values are based on the total weight of monomers in the polymerizable composition used to form the precursor polymeric material.

Embodiment 9B is the method of any one of embodiments 1B to 8B, wherein the nitrogen-containing compound has a molecular weight no greater than 2000 Daltons.

Embodiment 10B is the method of any one of embodiments 1B to 9B, wherein the nitrogen-containing compound is of Formula (IV).

$$R_3NHR_2 \quad (IV)$$

In Formula (IV), the group $R_2$ is hydrogen or an alkyl. The group $R_3$ is hydrogen, an alky, a group of formula —$R_4$—NHR$_5$, or —(C=NH)—NH$_2$. The group $R_4$ is a covalent bond, an alkylene, an arylene, an aralkylene, a heteroalkylene having one or more oxy (—O—) groups, or a heteroalkylene having one or more —NH— groups. The group $R_5$ is hydrogen, alkyl, or —(C=NH)—NH$_2$.

Embodiment 11B is the method of embodiment 10B, wherein $R_3$ is a group of formula —$R_4$—NHR$_5$ and the nitrogen-containing compound is of Formula (IV-1).

$$R_5HN-R_4-NHR_2 \quad (IV-1)$$

Embodiment 12B is the method of embodiment 11B, wherein the group $R_4$ is a covalent bond or an alkylene.

Embodiment 13B is the method of 11B, wherein the group $R_4$ is a heteroalkylene having at least one catenary —O— or —NH— group.

Embodiment 14B is the method of 13B, wherein the nitrogen-containing compound is of Formulas (IV-2) or (IV-3)

$$R_5HN-R_a-[O-R_b]_n-NHR_2 \quad \text{(IV-2)}$$

$$R_5HN-R_a-[NH-R_b]_n-NHR_2 \quad \text{(IV-3)}$$

wherein each $R_a$ and each $R_b$ are independently an alkylene and n is an integer in a range of 1 to 50.

Embodiment 15B is the method of embodiment 13B or 14B, wherein the nitrogen-containing compound is of formula $H_2N-[(CH_2)_xNH]_y-(CH_2)_xNH_2$ where x is an integer in a range of 1 to 4 and y is in a range of 1 to 10.

Embodiment 16B is the method of embodiment 10B, wherein the nitrogen-containing compound is of Formula (IV-4) or (IV-5)

$$NH_2-(C=NH)-HN-R_4-NHR_2 \quad \text{(IV-4)}$$

$$H_2N-(C=NH)-NHR_2 \quad \text{(IV-5)}$$

wherein group $R_4$ is alkylene.

Embodiment 17B is the method of any one of embodiments 1B to 11B, wherein the nitrogen-containing compound is ammonia, alkylamine, or alkylene diamine.

Embodiment 18B is the method of any one of embodiments 1B to 11B, wherein the nitrogen-containing compound is a poly(alkylene oxide) diamine.

Embodiment 19B is the method of any one of embodiments 1B to 11B, wherein the nitrogen-containing compound is phenylene diamine, diethylene triamine, triethylene tetramine, tetraethylene pentamine, N,N'-dimethylethylene diamine, hydrazine, agmatine, or guanidine.

Embodiment 20B is the method of any one of embodiments 1B to 9B, wherein the nitrogen-containing compound is of Formula (V).

$$R_6-(NHR_2)_z \quad \text{(V)}$$

In Formula (V), $R_6$ is a z-valent radical of an alkane or a z-valent radical of a heteroalkane.

Embodiment 21B is the method of embodiment 20B, wherein the nitrogen-containing compound is polyethylene imine or 2-(aminomethyl)-2-methyl-1,3-propanediamine.

Embodiment 22B is the method of any one of embodiments 1B to 21B, wherein the porous polymeric sorbent has the total pore volume of at least 0.20 $cm^3$/gram, the total pore volume being measured by adsorbing argon at 77° K at a relative pressure equal to 0.98±0.01.

Embodiment 23B is the method of embodiments 1B to 22B, wherein the total pore volume is at least 0.25 $cm^3$/gram or at least 0.30 $cm^3$/gram.

Embodiment 24B is the method of any one of embodiments 1B to 23B, wherein the BET specific surface area of the porous polymeric sorbent is at least 300 $m^2$/gram.

Embodiment 25B is the method of any one of embodiments 1B to 24B, wherein the BET specific surface area of the porous polymeric sorbent is at least 350 $m^2$/gram.

Embodiment 26B is the method of any one of embodiments 1B to 25B, wherein at least 20 percent of the BET specific surface area is attributable to micropores, mesopores, or a combination thereof.

Embodiment 27B is the method of any one of embodiments 1B to 26B, wherein at least 50 percent of the BET specific surface area is attributable to micropores, mesopores, or a combination thereof.

Embodiment 28B is the method of any one of embodiments 1B to 27B, wherein an amount of carbon dioxide sorbed on the porous polymeric sorbent is at least 2 mmoles/gram (i.e., 2 mmoles carbon dioxide per gram of porous polymeric sorbent) at room temperature (e.g., 25° C.) and 20 bar.

Embodiment 29B is the method of any one of embodiments 1B to 28B, wherein an amount of carbon dioxide sorbed on the porous polymeric sorbent is at least 2.5 mmoles/gram or at least 3 mmoles/gram at room temperature (e.g., 25° C.) and 20 bar.

Embodiment 30B is the method of any one of embodiments 1B to 29B, wherein an amount of carbon dioxide sorbed on the porous polymeric sorbent in mmoles/gram is at least 2.5 times greater at room temperature (e.g., 25° C.) and 20 bar than at room temperature (e.g., 25° C.) and 1 bar.

Embodiment 31B is the method of any one of embodiments 1B to 30B, wherein an amount of carbon dioxide sorbed on the porous polymeric sorbent in mmoles/gram is at least 3 times greater or at least 4 times greater at room temperature (e.g., 25° C.) and 20 bar than at room temperature (e.g., 25° C.) and 1 bar.

Embodiment 32B is the method of any one of embodiments 1B to 31B, wherein sorbing occurs at a first pressure and the method further comprises removing carbon dioxide sorbed on the porous polymeric sorbent at a second pressure that is lower than the first pressure and that is greater than or equal to ambient pressure or 1 bar.

Embodiment 33B is the method of any one of embodiments 1B to 32B, wherein the gas mixture comprises carbon dioxide and methane and wherein an amount of carbon dioxide sorbed on the porous polymeric sorbent in mmoles/gram at room temperature (e.g., 25° C.) and 20 bar is at least 2 times greater than an amount of methane sorbed on the porous polymeric sorbent in mmoles/gram at room temperature (e.g., 25° C.) and 20 bar.

Embodiment 1C is a composition that includes (a) a polymeric sorbent as described above and (b) carbon dioxide sorbed on the polymeric sorbent. The polymeric sorbent is a reaction product of (a) a precursor polymeric material and (b) a nitrogen-containing compound. The precursor polymeric material comprises a polymerized product of a polymerizable composition containing (1) 8 to 40 weight percent maleic anhydride based on the total weight of monomers in the polymerizable composition, (2) 48 to 75 weight percent divinylbenzene based on the total weight of monomers in the polymerizable composition, and (3) 0 to 20 weight percent of a styrene-type monomer based on the total weight of monomers in the polymerizable composition, wherein the styrene-type monomer is styrene, an alkyl-substituted styrene, or a combination thereof. The nitrogen-containing compound is selected from ammonia, a compound having a single primary amino group ($-NH_2$), or a compound having at least two amino groups of formula $-NHR$ where R is hydrogen or alkyl.

Embodiment 2C is the composition of embodiment 1C, wherein the polymeric sorbent has a BET specific surface area equal to at least 250 $m^2$/gram.

Embodiment 3C is the composition of embodiment 1C or 2C, wherein the polymeric sorbent has a BET specific surface area in a range of 250 $m^2$/gram to 900 $m^2$/gram.

Embodiment 4C is the composition of any one of embodiments 1C to 3C, wherein the polymerizable composition comprises 10 to 40 weight percent maleic anhydride, 50 to 75 weight percent divinylbenzene, and 1 to 20 weight percent styrene-type monomers. The weight percent values are based on the total weight of monomers in the polymerizable composition used to form the precursor polymeric material.

Embodiment 5C is the composition of any one of embodiments 1C to 4C, wherein the polymerizable composition comprises 15 to 35 weight percent maleic anhydride, 55 to 75 weight percent divinylbenzene, and 1 to 20 weight percent styrene-type monomers. The weight percent values are based on the total weight of monomers in the polymerizable composition used to form the precursor polymeric material.

Embodiment 6C is the composition of any one of embodiments 1C to 5C, wherein the polymerizable composition comprises 20 to 30 weight percent maleic anhydride, 55 to 75 weight percent divinylbenzene, and 1 to 20 weight percent styrene-type monomer. The weight percent values are based on the total weight of monomers in the polymerizable composition used to form the precursor polymeric material.

Embodiment 7C is the composition of any one of embodiments 1C to 6C, wherein the polymerizable composition comprises 20 to 35 weight percent maleic anhydride, 55 to 70 weight percent divinylbenzene, and 1 to 20 weight percent styrene-type monomers. The weight percent values are based on the total weight of monomers in the polymerizable composition used to form the precursor polymeric material.

Embodiment 8C is the composition of any one of embodiments 1C to 7C, wherein the polymerizable composition contains 20 to 40 weight percent maleic anhydride, 50 to 70 weight percent divinylbenzene, and 5 to 20 weight percent styrene-type monomer. The weight percent values are based on the total weight of monomers in the polymerizable composition used to form the precursor polymeric material.

Embodiment 9C is the composition of any one of embodiments 1C to 8C, wherein the nitrogen-containing compound has a molecular weight no greater than 2000 Daltons.

Embodiment 10C is the composition of any one of embodiments 1C to 9C, wherein the nitrogen-containing compound is of Formula (IV).

$$R_3NHR_2 \tag{IV}$$

In Formula (IV), the group $R_2$ is hydrogen or an alkyl. The group $R_3$ is hydrogen, an alkyl, a group of formula —$R_4$—$NHR_5$, or —(C=NH)—$NH_2$. The group $R_4$ is a covalent bond, an alkylene, an arylene, an aralkylene, a heteroalkylene having one or more oxy (—O—) groups, or a heteroalkylene having one or more —NH— groups. The group $R_5$ is hydrogen, alkyl, or —(C=NH)—$NH_2$.

Embodiment 11C is the composition of embodiment 10C, wherein $R_3$ is a group of formula —$R_4$—$NHR_5$ and the nitrogen-containing compound is of Formula (IV-1).

$$R_5HN—R_4—NHR_2 \tag{IV-1}$$

Embodiment 12C is the composition of embodiment 11C, wherein the group $R_4$ is a covalent bond or an alkylene.

Embodiment 13C is the composition of embodiment 11C, wherein the group $R_4$ is a heteroalkylene having at least one catenary —O— or —NH— group.

Embodiment 14C is the composition of embodiment 13C, wherein the nitrogen-containing compound is of Formulas (IV-2) or (IV-3)

$$R_5HN—R_a—[O—R_b]_n—NHR_2 \tag{IV-2}$$

$$R_5HN—R_a—[NH—R_b]_n—NHR_2 \tag{IV-3}$$

wherein each $R_a$ and each $R_b$ are independently an alkylene and n is an integer in a range of 1 to 50.

Embodiment 15C is the composition of embodiment 13C or 14C, wherein the nitrogen-containing compound is of formula $H_2N—[(CH_2)_xNH]_y—(CH_2)_xNH_2$ where x is an integer in a range of 1 to 4 and y is in a range of 1 to 10.

Embodiment 16C is the composition of embodiment 10C, wherein the nitrogen-containing compound is of Formula (IV-4) or (IV-5)

$$NH_2—(C=NH)—HN—R_4—NHR_2 \tag{IV-4}$$

$$H_2N—(C=NH)—NHR_2 \tag{IV-5}$$

wherein group $R_4$ is alkylene.

Embodiment 17C is the composition of any one of embodiments 1C to 11C, wherein the nitrogen-containing compound is ammonia, alkylamine, or alkylene diamine.

Embodiment 18C is the composition of any one of embodiments 1C to 11C, wherein the nitrogen-containing compound is a poly(alkylene oxide) diamine.

Embodiment 19C is the composition of any one of embodiments 1C to 11C, wherein the nitrogen-containing compound is phenylene diamine, diethylene triamine, triethylene tetramine, tetraethylene pentamine, N,N'-dimethylethylene diamine, hydrazine, agmatine, or guanidine.

Embodiment 20C is the composition of any one of embodiments 1C to 9C, wherein the nitrogen-containing compound is of Formula (V).

$$R_6—(NHR_2)_z \tag{V}$$

In Formula (V), $R_6$ is a z-valent radical of an alkane or a z-valent radical of a heteroalkane.

Embodiment 21C is the composition of embodiment 20C, wherein the nitrogen-containing compound is polyethylene imine or 2-(aminomethyl)-2-methyl-1,3-propanediamine.

Embodiment 22C is the composition of any one of embodiments 1C to 21C, wherein the porous polymeric sorbent has the total pore volume of at least 0.20 $cm^3$/gram, the total pore volume being measured by adsorbing argon at 77° K at a relative pressure equal to 0.98±0.01.

Embodiment 23C is the composition of embodiments 1C to 22C, wherein the total pore volume is at least 0.25 $cm^3$/gram or at least 0.30 $cm^3$/gram.

Embodiment 24C is the composition of any one of embodiments 1C to 23C, wherein the BET specific surface area of the porous polymeric sorbent is at least 300 $m^2$/gram.

Embodiment 25C is the composition of any one of embodiments 1C to 24C, wherein the BET specific surface area of the porous polymeric sorbent is at least 350 $m^2$/gram.

Embodiment 26C is the composition of any one of embodiments 1C to 25C, wherein at least 20 percent of the BET specific surface area is attributable to micropores, mesopores, or a combination thereof.

Embodiment 27C is the composition of any one of embodiments 1C to 26C, wherein at least 50 percent of the BET specific surface area is attributable to micropores, mesopores, or a combination thereof.

Embodiment 28C is the composition of any one of embodiments 1C to 27C, wherein an amount of carbon dioxide sorbed on the porous polymeric sorbent is at least 2 mmoles/gram (i.e., 2 mmoles carbon dioxide per gram of porous polymeric sorbent) at room temperature (e.g., 25° C.) and 20 bar.

Embodiment 29C is the composition of any one of embodiments 1C to 28C, wherein an amount of carbon dioxide sorbed on the porous polymeric sorbent is at least 2.5 mmoles/gram or at least 3 mmoles/gram at room temperature (e.g., 25° C.) and 20 bar.

Embodiment 30C is the composition of any one of embodiments 1C to 29C, wherein an amount of carbon dioxide sorbed on the porous polymeric sorbent in mmoles/ gram is at least 2.5 times greater at room temperature (e.g., 25° C.) and 20 bar than at room temperature (e.g., 25° C.) and 1 bar.

Embodiment 31C is the composition of any one of embodiments 1C to 30C, wherein an amount of carbon dioxide sorbed on the porous polymeric sorbent in mmoles/gram is at least 3 times greater or at least 4 times greater at room temperature (e.g., 25° C.) and 20 bar than at room temperature (e.g., 25° C.) and 1 bar.

Embodiment 32C is the composition of any one of embodiments 1C to 31C, wherein the gas mixture comprises carbon dioxide and methane and wherein an amount of carbon dioxide sorbed on the porous polymeric sorbent in mmoles/gram at room temperature (e.g., 25° C.) and 20 bar is at least 2 times greater than an amount of methane sorbed on the porous polymeric sorbent in mmoles/gram at room temperature (e.g., 25° C.) and 20 bar.

Embodiment 1D is a method of preparing a polymeric sorbent. The method includes providing a precursor polymeric material. The precursor polymeric material comprises a polymerized product of a polymerizable composition containing (1) 8 to 40 weight percent maleic anhydride based on the total weight of monomers in the polymerizable composition, (2) 48 to 75 weight percent divinylbenzene based on the total weight of monomers in the polymerizable composition, and (3) 0 to 20 weight percent of a styrene-type monomer based on the total weight of monomers in the polymerizable composition, wherein the styrene-type monomer is styrene, an alkyl-substituted styrene, or a combination thereof. The method further includes reacting the precursor polymeric material with a nitrogen-containing compound is selected from ammonia, a compound having a single primary amino group (—NH$_2$), or a compound having at least two amino groups of formula —NHR where R is hydrogen or alkyl. The reacting results in the formation of the polymeric sorbent having a covalently attached nitrogen-containing group.

Embodiment 2D is the method of embodiment 1D, wherein the polymeric sorbent has a BET specific surface area equal to at least 250 m$^2$/gram.

Embodiment 3D is the method of embodiment 1D or 2D, wherein the polymeric sorbent has a BET specific surface area in a range of 250 m$^2$/gram to 900 m$^2$/gram.

Embodiment 4D is the method of any one of embodiments 1D to 3D, wherein the polymerizable composition comprises 10 to 40 weight percent maleic anhydride, 50 to 75 weight percent divinylbenzene, and 1 to 20 weight percent styrene-type monomers. The weight percent values are based on the total weight of monomers in the polymerizable composition used to form the precursor polymeric material.

Embodiment 5D is the method of any one of embodiments 1D to 4D, wherein the polymerizable composition comprises 15 to 35 weight percent maleic anhydride, 55 to 75 weight percent divinylbenzene, and 1 to 20 weight percent styrene-type monomers. The weight percent values are based on the total weight of monomers in the polymerizable composition used to form the precursor polymeric material.

Embodiment 6D is the method of any one of embodiments 1D to 5D, wherein the polymerizable composition comprises 20 to 30 weight percent maleic anhydride, 55 to 75 weight percent divinylbenzene, and 1 to 20 weight percent styrene-type monomer. The weight percent values are based on the total weight of monomers in the polymerizable composition used to form the precursor polymeric material.

Embodiment 7D is the method of any one of embodiments 1D to 6D, wherein the polymerizable composition comprises 20 to 35 weight percent maleic anhydride, 55 to 70 weight percent divinylbenzene, and 1 to 20 weight percent styrene-type monomers. The weight percent values are based on the total weight of monomers in the polymerizable composition used to form the precursor polymeric material.

Embodiment 8D is the method of any one of embodiments 1D to 7D, wherein the polymerizable composition contains 20 to 40 weight percent maleic anhydride, 50 to 70 weight percent divinylbenzene, and 5 to 20 weight percent styrene-type monomer. The weight percent values are based on the total weight of monomers in the polymerizable composition used to form the precursor polymeric material.

Embodiment 9D is the method of any one of embodiments 1D to 8D, wherein the nitrogen-containing compound has a molecular weight no greater than 2000 Daltons.

Embodiment 10D is the method of any one of embodiments 1D to 9D, wherein the nitrogen-containing compound is of Formula (IV).

$$R_3NHR_2 \quad\quad (IV)$$

In Formula (IV), the group $R_2$ is hydrogen or an alkyl. The group $R_3$ is hydrogen, an alkyl, a group of formula —$R_4$—NHR$_5$, or —(C=NH)—NH$_2$. The group $R_4$ is a covalent bond, an alkylene, an arylene, an aralkylene, a heteroalkylene having one or more oxy (—O—) groups, or a heteroalkylene having one or more —NH— groups. The group $R_5$ is hydrogen, alkyl, or —(C=NH)—NH$_2$.

Embodiment 11D is the method of embodiment 10D, wherein $R_3$ is a group of formula —$R_4$—NHR$_5$ and the nitrogen-containing compound is of Formula (IV-1).

$$R_5HN—R_4—NHR_2 \quad\quad (IV-1)$$

Embodiment 12D is the method of embodiment 11D, wherein the group $R_4$ is a covalent bond or an alkylene.

Embodiment 13D is the method of embodiment 11D, wherein the group $R_4$ is a heteroalkylene having at least one catenary —O— or —NH— group.

Embodiment 14D is the method of embodiment 13D, wherein the nitrogen-containing compound is of Formula (IV-2) or (IV-3)

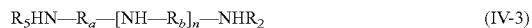

$$R_5HN—R_a—[O—R_b]_n—NHR_2 \quad\quad (IV-2)$$

$$R_5HN—R_a—[NH—R_b]_n—NHR_2 \quad\quad (IV-3)$$

wherein each $R_a$ and each $R_b$ are independently an alkylene and n is an integer in a range of 1 to 50.

Embodiment 15D is the method of embodiment 13D or 14D, wherein the nitrogen-containing compound is of formula H$_2$N—[(CH$_2$)$_x$NH]$_y$—(CH$_2$)$_x$NH$_2$ where x is an integer in a range of 1 to 4 and y is in a range of 1 to 10.

Embodiment 16D is the method of embodiment 10D, wherein the nitrogen-containing compound is of Formula (IV-4) or (IV-5)

$$NH_2—(C=NH)—HN—R_4—NHR_2 \quad\quad (IV-4)$$

$$H_2N—(C=NH)—NHR_2 \quad\quad (IV-5)$$

wherein group $R_4$ is alkylene.

Embodiment 17D is the method of any one of embodiments 1D to 11D, wherein the nitrogen-containing compound is ammonia, alkylamine, or alkylene diamine.

Embodiment 18D is the method of any one of embodiments 1D to 11D, wherein the nitrogen-containing compound is a poly(alkylene oxide) diamine.

Embodiment 19D is the method of any one of embodiments 1D to 11D, wherein the nitrogen-containing compound is phenylene diamine, diethylene triamine, triethylene tetramine, tetraethylene pentamine, N,N'-dimethyethylene diamine, hydrazine, agmatine, or guanidine.

Embodiment 20D is the method of any one of embodiments 1D to 9D, wherein the nitrogen-containing compound is of Formula (V).

$$R_6—(NHR_2)_z \quad (V)$$

In Formula (V), $R_6$ is a z-valent radical of an alkane or a z-valent radical of a heteroalkane.

Embodiment 21D is the method of embodiment 20D, wherein the nitrogen-containing compound is polyethylene imine or 2-(aminomethyl)-2-methyl-1,3-propanediamine.

Embodiment 22D is the method of any one of embodiments 1D to 21D, wherein the porous polymeric sorbent has the total pore volume of at least 0.20 cm³/gram, the total pore volume being measured by adsorbing argon at 77° K at a relative pressure equal to 0.98±0.01.

Embodiment 23D is the method of embodiments 1D to 22D, wherein the total pore volume is at least 0.25 cm³/gram or at least 0.30 cm³/gram.

Embodiment 24D is the method of any one of embodiments 1D to 23D, wherein the BET specific surface area of the porous polymeric sorbent is at least 300 m²/gram.

Embodiment 25D is the method of any one of embodiments 1D to 24D, wherein the BET specific surface area of the porous polymeric sorbent is at least 350 m²/gram.

Embodiment 26D is the method of any one of embodiments 1D to 25D, wherein at least 20 percent of the BET specific surface area is attributable to micropores, mesopores, or a combination thereof.

Embodiment 27D is the method of any one of embodiments 1D to 26D, wherein at least 50 percent of the BET specific surface area is attributable to micropores, mesopores, or a combination thereof.

EXAMPLES

TABLE 1

List of materials.

| Chemical Name | Chemical Supplier |
|---|---|
| Divinylbenzene (DVB) (80% tech grade) contained 80 weight percent DVB and 20 weight percent styrene-type monomers. The calculation of moles of DVB used to prepare the polymeric material does take into account the purity. | Sigma-Aldrich, Milwaukee, WI |
| Maleic anhydride (MA) | Alfa Aesar, Ward Hill, MA |
| Benzoyl peroxide (BPO) | Sigma-Aldrich, Milwaukee, WI |
| Ethyl acetate (EtOAc) | EMD Millipore Chemicals, Billerica, MA |
| Hydrazine monohydrate | Alfa Aesar, Ward Hill, MA |
| Ethanol - denatured (EtOH) | EMD Millipore Chemicals, Billerica, MA |
| Ammonium hydroxide (28-30 wt. % ammonia) | EM Science, Gibbstown, NJ |
| Ethylenediamine (EDA) | Alfa Aesar, Ward Hill, MA |

Argon Adsorption Analysis:

Porosity and gas sorption experiments were performed using a Micromeritics Instrument Corporation (Norcross, Ga.) accelerated surface area and porosimetry (ASAP) 2020 system using adsorbates of ultra-high purity. The following is a typical method used for the characterization of the porosity within the exemplified porous polymeric sorbents. In a Micromeritics half inch diameter sample tube, 50-250 milligrams of material was degassed by heating under ultra-high vacuum (3-7 micrometers Hg) on the analysis port of the ASAP 2020 to remove residual solvent and other adsorbates. The degas procedure for the precursor polymeric material was 2 hours at 150° C. The degas procedure for the porous polymeric sorbents was 2 hours at 80° C.

Argon sorption isotherms at 77° K were obtained using low pressure dosing (5 cm³/g) at a relative pressure (p/p°) less than 0.1 and a pressure table of linearly spaced pressure points from a p/p° from 0.1 to 0.98. The method for all isotherms made use of the following equilibrium intervals: 90 seconds at p/p° less than $10^{-5}$, 40 seconds at p/p° in a range of $10^{-5}$ to 0.1, and 20 seconds at p/p° greater than 0.1. Helium was used for the free space determination, after argon sorption analysis, both at ambient temperature and at 77° K. BET specific surface areas ($SA_{BET}$) were calculated from argon adsorption data by multipoint Brunauer-Emmett-Teller (BET) analysis.

Apparent micropore distributions were calculated from argon adsorption data by density functional theory (DFT) analysis using the argon at 77° K on carbon slit pores by non-linear density functional theory (NLDFT) model. Total pore volume was calculated from the total amount of argon adsorbed at a p/p° equal to approximately 0.98. BET, DFT and total pore volume analyses were performed using Micromeritics MicroActive Version 1.01 software.

Carbon Dioxide and Methane Adsorption Analysis:

A high pressure microgravimetric gas sorption system model IGA-001 from Hiden Analytical (Warrington, U.K.) was used to measure the $CO_2$ and $CH_4$ adsorption isotherms for the porous polymeric sorbents at 25° C. This automated instrument integrates precise computer-control and measurement of weight change, pressure, and temperature during measurements to determine the gas adsorption/desorption isotherms of small quantities of materials. The following is a general procedure for the $CO_2$ and $CH_4$ adsorption/desorption isotherm measurement of the copolymers of the porous polymeric sorbents exemplified.

Prior to measurements, approximately 100 mg of a porous polymeric sorbent was loaded onto the quartz crucible provided with the instrument. The crucible was then attached to the internal suspension rods of the microbalance. The samples were degassed at 80° C. for 8 hours under high vacuum (less than 1 mm Hg). After degassing, the weight of the sample was recorded and set as the initial reference weight for adsorption. Ultrahigh purity gases ($CO_2$ or $CH_4$) were introduced in predetermined pressure steps, starting from vacuum and going up to 20 bar. During measurements, the sample temperature was kept constant (25.0±0.05° C.) by using a circulating water bath. After each variation of pressure, the weight relaxation was monitored in real time by the instrument's software, and the asymptotic equilibrium weight was calculated. After equilibration at each pressure level, a new pressure change was caused and the system moved to the next isotherm point. A normal cycle consisted of an adsorption branch (vacuum to 20 bar) and a reversed desorption branch (20 bar down to vacuum). Buoyancy corrections were made by using the skeletal density of each porous polymeric sorbent obtained from helium pycnometry measurements. The precision of gravimetric measurements is estimated to be ±0.01 wt. % for a 100 mg sample at a pressure of 20 bar.

Preparatory Example 1

In a 5 L round-bottom flask, 80.3 grams (493 mmoles) divinylbenzene (DVB) (80 wt. %, tech grade), 30.3 grams (309 mmoles) of maleic anhydride (MA), and 2.25 grams (9.29 mmoles) of benzoyl peroxide (BPO) were dissolved in 2153 grams of ethyl acetate (EtOAc). The polymerizable composition had 5.0 wt. % solids in EtOAc and contained a monomer mixture (58.1 wt. % DVB, 27.3 wt. % MA, and 14.5 wt. % styrene-type monomers) and 2 wt. % BPO (based on total weight of monomers). The polymerizable composition was bubbled with nitrogen for 30 minutes. The flask was then capped and placed in a sand bath at 95° C. The polymerizable composition was heated at this elevated temperature for 18 hours. A white precipitate that had formed was isolated by vacuum filtration and washed with EtOAc. The solid was divided up and placed in three 32 ounce jars. The jars were then each filled with 750 mL of EtOAc. The solids were allowed to stand in EtOAc for one hour at room temperature. The solids were again isolated by vacuum filtration and washed with EtOAc. The solid was divided up again and placed in three 32 ounce jars. The jars were then each filled with 750 mL of EtOAc. The solids were allowed to stand in EtOAc overnight. The solids were again isolated by vacuum filtration and washed with EtOAc. The solid was then dried under high vacuum at 95° C. for eight hours. This polymeric precursor material had a $SA_{BET}$ of 637.6 m$^2$/gram and a total pore volume of 0.637 cm$^3$/gram (p/p° equal to 0.971) as determined by argon adsorption.

Example 1

In a 32 ounce jar, 29.8 mL (446 mmoles) of ethylene diamine (EDA) was dissolved in 600 mL of ethanol (EtOH). To this solution was added 10.0 grams of the precursor polymeric material of Preparatory Example 1. The jar was capped and placed in a sand bath at 80° C. This suspension was heated at this elevated temperature for 18 hours. The solid was isolated by vacuum filtration and washed with EtOH. The solid was placed in an 8 ounce jar, and 150 mL of EtOH was added to the jar. The solid was allowed to stand in the EtOH for four hours. The solid was again isolated by vacuum filtration and washed with EtOH. The solid was then dried under high vacuum at 80° C. for eight hours.

Figure 2:
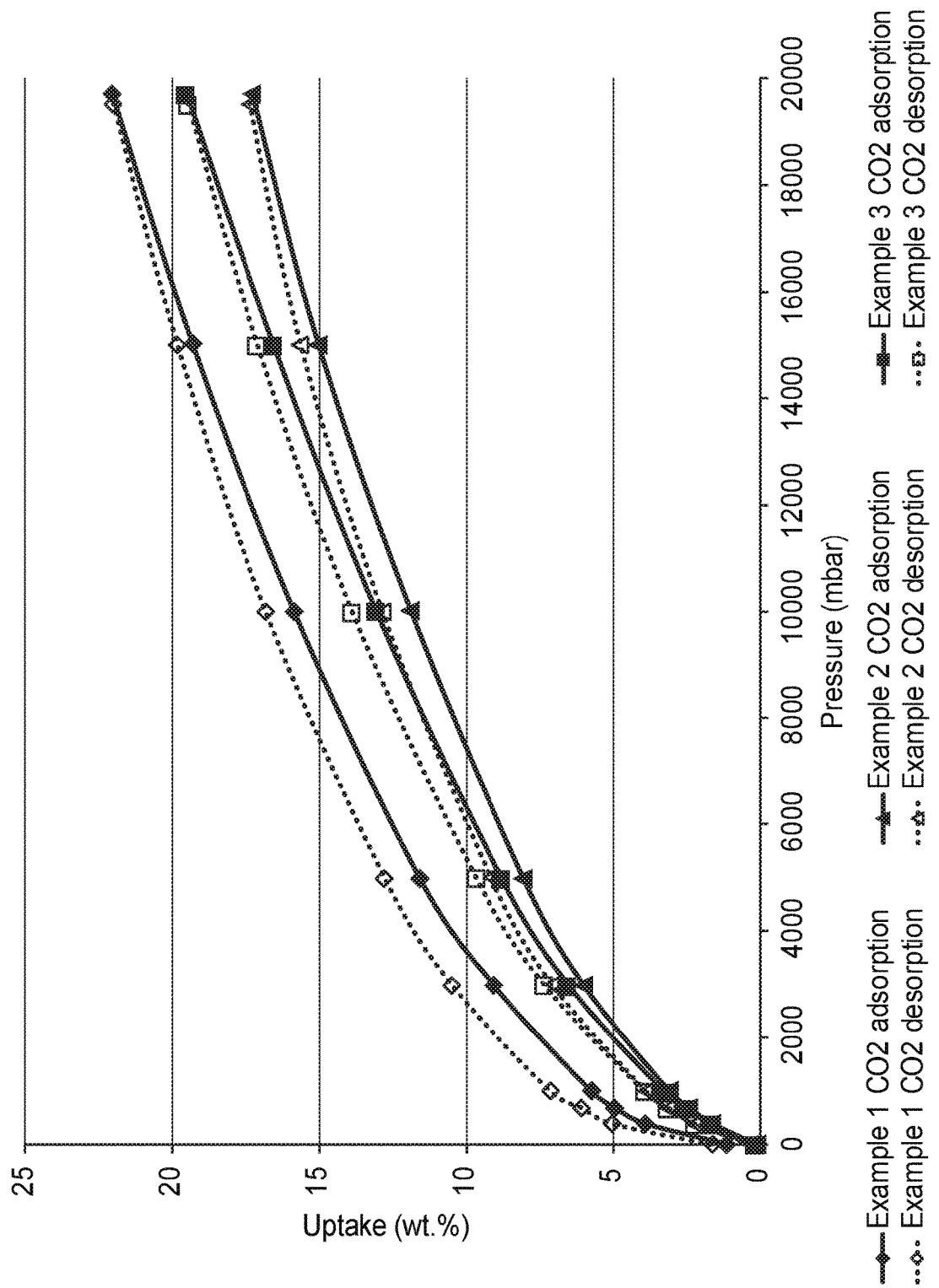
FIG. 2 contains plots for carbon dioxide adsorption and desorption at various pressures up to 20 bar for the exemplary polymeric sorbents of Examples 1-3.

This porous polymeric sorbent had a $SA_{BET}$ of 466.5 m$^2$/gram and a total pore volume of 0.485 cm$^3$/gram (p/p° equal to 0.977) as determined by argon adsorption. This porous polymeric sorbent adsorbed 5.02 mmoles/gram (22.1 wt. % uptake) $CO_2$ at 20 bar and 1.30 mmoles/gram (5.7 wt. % uptake) $CO_2$ at 1 bar. This porous polymeric sorbent adsorbed 1.37 mmoles/gram (2.2 wt. % uptake) $CH_4$ at 20 bar and 0.29 mmoles/gram (0.47 wt. % uptake) $CH_4$ at 1 bar. FIG. 1 contains a plot for both carbon dioxide adsorption and desorption, as well as, methane adsorption and desorption at various pressures up to 20 bar for this porous polymeric sorbent. FIG. 2 contains a plot for carbon dioxide adsorption and desorption at various pressures up to 20 bar for the porous polymeric sorbents of Examples 1-3. FIG. 3 is the argon adsorption isotherm at 77° K and at relative pressures up to 0.98±0.01 for the porous polymeric sorbent of Example 1.

Example 2

In a 32 ounce jar, 5.0 mL (72.5 mmoles) of 14.5 M aqueous ammonium hydroxide was dissolved in 85 mL of deionized water. To this solution was added 3.00 grams of the precursor polymeric material of Preparatory Example 1. The jar was capped and placed in a sand bath at 90° C. This suspension was heated at this elevated temperature for 18 hours. The solid was isolated by vacuum filtration and washed with deionized water. The solid was placed in an 8 ounce jar, and 150 mL of deionized water was added to the jar. The solid was allowed to stand in the deionized water for four hours. The solid was again isolated by vacuum filtration and washed with deionized water. The solid was then dried under high vacuum at 80° C. for 8 hours.

This porous polymeric sorbent had a $SA_{BET}$ of 377.1 m$^2$/gram and a total pore volume of 0.371 cm$^3$/gram (p/p° equal to 0.977) as determined by argon adsorption. This porous polymeric sorbent adsorbed 3.93 mmoles/gram (17.3 wt. % uptake) $CO_2$ at 20 bar and 0.70 mmoles/gram (3.1 wt. % uptake) $CO_2$ at 1 bar. FIG. 2 contains a plot for carbon dioxide adsorption and desorption at various pressures up to 20 bar for the porous polymeric sorbents of Examples 1-3.

Example 3

In an 8 ounce jar, 5.5 mL (113 mmoles) of hydrazine monohydrate was dissolved in 150 mL EtOH. To this solution was added 5.00 grams of the precursor polymeric material of Preparatory Example 1. The jar was capped and placed in a sand bath at 80° C. This suspension was heated at this elevated temperature for 18 hours. The solid was isolated by vacuum filtration and washed with EtOH. The solid was placed in an 8 ounce jar and 150 mL of EtOH was added to the jar. The solid was allowed to stand in the EtOH for four hours. The solid was again isolated by vacuum filtration and washed with EtOH. The solid was again placed in an 8 ounce jar and 150 mL of EtOH was added to the jar. The solid was allowed to stand in the EtOH for another four hours. The solid was again isolated by vacuum filtration and washed with EtOH. The solid was then dried under high vacuum at 80° C. for eight hours.

This material had a $SA_{BET}$ of 524.1 m$^2$/gram and a total pore volume of 0.529 cm$^3$/grams (p/p°) equal to 0.976) as determined by argon adsorption. This porous polymeric sorbent adsorbed 4.43 mmoles/gram (19.5 wt. % uptake) $CO_2$ at 20 bar and 0.75 mmoles/gram (3.3 wt. % uptake) $CO_2$ at 1 bar. FIG. 2 contains a plot for carbon dioxide adsorption and desorption at various pressures up to 20 bar for the porous polymeric sorbents of Examples 1-3.

What is claimed is:

1. A polymeric sorbent comprising a reaction product of
    (a) a precursor polymeric material comprising a polymerized product of a polymerizable composition comprising
        (1) 8 to 40 weight percent maleic anhydride based on a total weight of monomers in the polymerizable composition;
        (2) 48 to 75 weight percent divinylbenzene based on the total weight of monomers in the polymerizable composition; and
        (3) 0 to 20 weight percent of a styrene-type monomer based on the total weight of monomers in the polymerizable composition, wherein the styrene-type monomer is styrene, an alkyl-substituted styrene, or a combination thereof; and
    (b) a nitrogen-containing compound that is selected from ammonia, a compound having a single primary amino group (—NH$_2$), or a compound having at least two amino groups of formula
    —NHR where R is hydrogen or alkyl,
    wherein the polymeric sorbent has a covalently attached nitrogen-containing group.

2. The polymeric sorbent of claim 1, wherein the polymeric sorbent has a BET specific surface area equal to at least 250 m$^2$/gram.

3. The polymeric sorbent of claim 1, wherein the polymerizable composition comprises 10 to 40 weight percent maleic anhydride, 50 to 75 weight percent divinylbenzene, and 1 to 20 weight percent styrene-type monomers.

4. The polymeric sorbent of claim 1, wherein the polymerizable composition comprises 15 to 35 weight percent maleic anhydride, 55 to 75 weight percent divinylbenzene, and 1 to 20 weight percent styrene-type monomers.

5. The polymeric sorbent of claim 1, wherein the nitrogen-containing compound has a molecular weight no greater than 2000 Daltons.

6. The polymeric sorbent of claim 1, wherein the nitrogen-containing compound is of Formula (IV)

$$R_3NHR_2 \qquad (IV)$$

wherein
- $R_2$ is hydrogen or an alkyl;
- $R_3$ is hydrogen, alkyl, a group of formula —$R_4$—NHRs or —(C=NH)—$NH_2$;
- $R_4$ is a covalent bond, an alkylene, an arylene, an aralkylene, a heteroalkylene having one or more oxy (—O—) groups, or a heteroalkylene having one or more one or more —NH— groups; and
- $R_5$ is hydrogen, alkyl, or —(C=NH)—$NH_2$.

7. The polymeric sorbent of claim 1, wherein the nitrogen-containing compound is of Formula (V)

$$R_6—(NHR_2)_z \qquad (V)$$

wherein
- $R_6$ is a z-valent radical of an alkane or a z-valent radical of a heteroalkane; and
- z is an integer in a range of 3 to 10.

8. A method of sorbing carbon dioxide on a polymeric sorbent, the method comprising:
providing a polymeric sorbent of claim 1;
sorbing carbon dioxide on the polymeric sorbent.

9. The method of claim 8, wherein the polymeric sorbent has a BET specific surface area equal to at least 250 $m^2$/gram.

10. The method of claim 8, wherein an amount of carbon dioxide sorbed on the polymeric sorbent in mmoles/gram is at least 2.5 times greater at 25° C. and 20 bar than at 25° C. and 1 bar.

11. The method of claim 8, wherein sorbing occurs at a first pressure and the method further comprises removing carbon dioxide sorbed on the polymeric sorbent at a second pressure that is lower than the first pressure and that is greater than or equal to 1 bar.

12. The method of claim 8, wherein a gas mixture comprises carbon dioxide and methane and wherein an amount of carbon dioxide sorbed on the polymeric sorbent in mmoles/gram at 25° C. and 20 bar is at least 2 times greater than an amount of methane sorbed on the polymeric sorbent in mmoles/gram at 25° C. and 20 bar.

13. A composition comprising:
(a) a polymeric sorbent of claim 1;
(b) carbon dioxide sorbed on the polymeric sorbent.

14. A method of forming a polymeric sorbent, the method comprising:
(a) providing a precursor polymeric material comprising a polymerized product of a polymerizable composition comprising:
(1) 8 to 40 weight percent maleic anhydride based on a total weight of monomers in the polymerizable composition;
(2) 48 to 75 weight percent divinylbenzene based on the total weight of monomers in the polymerizable composition; and
(3) 0 to 20 weight percent of a styrene-type monomer based on the total weight of monomers in the polymerizable composition, wherein the styrene-type monomer is styrene, an alkyl-substituted styrene, or a combination thereof; and
(b) reacting the precursor polymeric material with a nitrogen-containing compound that is selected from ammonia, a compound having a single primary amino group (—$NH_2$), or a compound having at least two amino groups of formula —NHR where R is hydrogen or alkyl to form the polymeric sorbent, wherein the polymeric sorbent has a covalently attached nitrogen-containing group.

* * * * *